(12) United States Patent
Kyono

(10) Patent No.: US 7,773,398 B2
(45) Date of Patent: Aug. 10, 2010

(54) DC POWER SOURCE DEVICE WITH TIMER CONTROLLED SYNCHRONOUS RECTIFIERS IN THE SECONDARY

(75) Inventor: Yoichi Kyono, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 455 days.

(21) Appl. No.: 11/576,346

(22) PCT Filed: Sep. 20, 2005

(86) PCT No.: PCT/JP2005/017308

§ 371 (c)(1),
(2), (4) Date: Mar. 30, 2007

(87) PCT Pub. No.: WO2006/035638

PCT Pub. Date: Apr. 6, 2006

(65) Prior Publication Data

US 2007/0263421 A1    Nov. 15, 2007

(30) Foreign Application Priority Data

Sep. 30, 2004    (JP) .............................. 2004-289191

(51) Int. Cl.
*H02M 3/338* (2006.01)

(52) U.S. Cl. .................. 363/127; 363/21.02; 363/21.06

(58) Field of Classification Search ................. 363/127, 363/21.06, 21.14, 21.02, 21.03, 16
See application file for complete search history.

(56) References Cited

U.S. PATENT DOCUMENTS

| 5,995,381 A | * | 11/1999 | Wakamatsu ................... 363/16 |
| 6,130,825 A | | 10/2000 | Imamura et al. |
| 6,137,698 A | | 10/2000 | Yukawa et al. |
| 6,535,400 B2 | * | 3/2003 | Bridge .................... 363/21.06 |

FOREIGN PATENT DOCUMENTS

| JP | 4127869 | 4/1992 |
| JP | 7312866 | 11/1995 |
| JP | 2002369516 | 12/2002 |

* cited by examiner

*Primary Examiner*—Harry Behm
(74) *Attorney, Agent, or Firm*—Bachman & LaPointe, P.C.

(57) ABSTRACT

A DC power source device is provided which comprises conduction detectors 17, 18 for producing detection signals $V_{P1}$, $V_{P2}$ during the detective period of rectification MOS-FETs 15, 16 and timer circuits 19, 20 connected to polarity detectors 17, 18. Timer circuits 19, 20 count output time of detection signal $V_{P1}$, $V_{P2}$ from polarity detectors 17, 18 until electric current through one of rectification MOS-FETs 15, 16 comes to zero, and turns the other of rectification MOS-FETs 15, 16 off immediately before termination of the counted time so that timer circuits 19, 20 can reliably turn rectification MOS-FETs 15, 16 off during the conductive period of forward current flow for efficient synchronous rectification.

10 Claims, 18 Drawing Sheets

DC POWER SOURCE DEVICE WITH TIMER CONTROLLED SYNCHRONOUS RECTIFIERS IN THE SECONDARY

FIELD IN INDUSTRY

This invention relates to a DC power source device such as a switching power source, in particular, for efficiently synchronous rectification.

BACKGROUND

Current-resonant DC power source devices of (SMZ or Soft-switching Multi-resonant Zero-cross) type are widely known as those having their high efficiency and less switching noise. For example, FIG. 20 indicates a prior art current-resonant DC power source device which comprises first and second main MOS-FETs 2 and 3 as a pair of main switching elements connected in series to a DC power source 1; a voltage-resonant capacitor 7 and a series circuit each connected in parallel to first MOS-FET 2, the series circuit having a resonance reactor 4, a primary winding 5a of a transformer 5 and a current-resonant capacitor 6; a first secondary winding 5b of transformer 5; a second secondary winding 5c connected in series to first secondary winding 5a with the same number of turns and same direction of turn; a pair of rectifying diodes 8 and 9 connected in series to opposite ends of first and second secondary windings 5b and 5c with the adverse polarity of first and second rectifying diodes 8 and 9 to each other; a smoothing capacitor 10 connected between a junction of rectifying diodes 8 and 9 and a junction of first and second secondary windings 5b and 5c of transformer 5; a voltage detector 12 for picking up DC output voltage $V_O$ applied on an electric load 11 from smoothing capacitor 10; and a control circuit 14 for producing drive signals $V_{G1}$ and $V_{G2}$ to main MOS-FETs 2 and 3 for the on-off operation thereof with modulation by detection signals supplied from voltage detector 12 through a photo-coupler 13 to control circuit 14. Parasitic diodes 2a and 3a are connected respectively between drain and source terminals of main MOS-FETs 2 and 3.

In operation of DC power source device shown in FIG. 20, when first and second MOS-FETs 2 and 3 are respectively in the off and on conditions, a resonant current flows from DC power source 1, second MOS-FET 3, resonance reactor 4, primary winding 5a of transformer 5 and current resonant capacitor 6 to DC power source 1 to raise voltage applied on primary winding 5a of transformer 5. When voltage induced on first secondary winding 5b of transformer 5 reaches DC output voltage $V_O$, first rectifying diode 8 is turned on to cause electric current to run from first secondary winding 5b through first rectifying diode 8 to smoothing capacitor 10 which therefore is electrically charged to supply DC power to load 11. At this moment, resonance current $I_{Lr}$ by resonance reactor 4 and current-resonant capacitor 6, flows through primary winding 5a of transformer 5. When voltage on primary winding 5a of transformer 5 begins to reduce, voltage developed on first secondary winding 5b begins to descend, and when voltage between both ends of first secondary winding 5b comes to or below DC output voltage $V_O$, first rectifying diode 8 is turned off to stop power supply to secondary side of transformer 5. At the same time, in primary side of transformer 5, resonance current $I_{Lr}$ flows through resonance reactor 4, primary winding 5a of transformer 5 and current-resonant capacitor 6 to accumulate electric energy in current-resonant capacitor 6, resonance reactor 4 and primary winding 5a of transformer 5. Then, when second main MOS-FET 3 is turned off under the off condition of first main MOS-FET 2, resonance reactor 4, primary winding 5a of transformer 5 and voltage-resonant capacitor 7 produce a voltage resonance to raise or lower voltage between drain and source terminals of first and second main MOS-FETs 2 and 3 with the voltage inclination determined by the resonance frequency. Thereafter, when first main MOS-FET 2 is turned on while retaining second MOS-FET 3 off, resonance current $I_{Lr}$ passes through resonance reactor 4, primary winding 5a of transformer 5 and current-resonant capacitor 6 while discharging energy stored in current-resonant capacitor 6, resonance reactor 4 and primary winding 5a of transformer 5, and resonance current $I_{Lr}$ begins to reduce and then flows in the adverse direction. When voltage on primary winding 5a of transformer 5 becomes an anti-polarity and voltage on second secondary winding 5c comes to a level same as that of DC output voltage $V_O$, second rectifying diode 9 is turned on to cause electric current to flow from second secondary winding 5c through second rectifying diode 9 while electrically charging smoothing capacitor 10 and supplying DC power to load 11. As voltage on primary winding 5a of transformer 5 begins to reduce, voltage on second secondary winding 5c concurrently drops. When voltage between both ends of second secondary winding 5c is lowered to or below DC output voltage $V_O$, second rectifying diode 9 is turned off to cease power supply to secondary side of transformer 5 while resonance current flows through resonance reactor 4, primary winding 5a of transformer 5 and current-resonant capacitor 6 in primary side of transformer 5. Continuation of these operations causes repetition of the alternating on-off operation of main MOS-FETs 2 and 3 with the 50% duty ratio. Voltage detector 12 picks out DC output voltage $V_O$ applied to load 11 to produce detection signals to control circuit 14 through photo-coupler 13. Control circuit 14 modulates pulse frequency of drive signals $V_{G1}$ and $V_{G2}$ supplied to gate terminals of each main MOS-FETs 2 and 3 based on detection signals from voltage detector 12 to control the on-off operation of main MOS-FETs 2 and 3 so as to maintain a substantially constant DC output voltage $V_O$.

In major cases, typical DC power source devices are improved in power conversion efficiency by adopting a synchronous rectification circuit, but in this fashion, the current resonant DC power source shown in FIG. 20 has a trouble in turning a switching element (not shown) in an adopted secondary synchronous rectification circuit on only during the on-period of secondary rectification circuit to pass forward electric current through the rectification circuit since the flowing period of electric current through secondary rectification diodes 8 and 9 is inconsistent with the induced period of voltage on secondary windings 5b and 5c of transformer 5 or the on-period of primary first and second main MOS-FETs 2 and 3. In addition, as an adverse voltage is applied on the switching element in the secondary rectification circuit during the period of time between cease of electric current flowing through the secondary rectification circuit and turning-off of primary first or second main MOS-FET 2 or 3, power conversion efficiency is reduced because an adverse current flows through the switching element in the rectification circuit when the switching element is turned on only during the induced period of voltage on secondary windings 5b and 5c of transformer 5 or during the on-period of primary main MOS-FETs 2 and 3.

To solve the foregoing problem, the following Patent Document 1 discloses a current-resonant switching power source of synchronous rectification type which represses an adverse current flow through a MOS transistor of synchronous rectification type due to back electromotive force of a choke coil connected to a secondary stage before a smoothing capacitor while electric current may flow in the opposite direction through a MOS transistor of synchronous rectification type turned on during the induced period of voltage on the secondary winding of transformer.

[Patent Document 1] Japanese Patent Disclosure No. 11-332233 (on page 4, FIG. 1)

DISCLOSURE OF INVENTION

Problem to be Solved by Invention

On the other hand, such a prior art DC power source device of synchronous rectification type needs to turn the rectification switching element off concomitantly with completion of current flow through the rectification circuit because a backward voltage is impressed on the secondary rectification switching element during the period between termination of current flow through the secondary rectification circuit and turning-off of primary main switching element. Accordingly, a proposal can be made for example that a current detector in the secondary circuit may detect electric current flowing from transformer through the rectification switching element in the secondary circuit to turn the rectification switching element immediately upon cease of the current flow, however, this proposal has a drawback because the current detector involves energy loss and thereby reduces power conversion efficiency. In particular, the current-resonant switching power source shown in Patent Document 1 must disadvantageously be formed into a larger size due to a choke coil connected in the secondary circuit, and the choke coil causes power loss which leads the reduced power conversion efficiency due to a large amount of electric current through the choke coil in the secondary circuit.

Accordingly, an object of the present invention is to provide a DC power source device for efficient synchronous rectification.

Means for Solving the Problem

The DC power source device according to the present invention, comprises a pair of main switching elements (2, 3) connected in series to a DC power supply (1); a primary winding (5a) of a transformer (5) connected in parallel to one of main switching elements (2, 3); a first secondary winding (5b) of transformer (5); a second secondary winding (5c) of transformer (5) connected in series to first secondary winding (5b); a pair of rectification switching elements (15, 16) connected in series to opposite ends of first and second secondary windings (5b, 5c) with the adverse polarity; polarity detectors (17, 18) for detecting the polarity of rectification switching elements (15, 16); and timer means (19, 20) connected to polarity detectors (17, 18). In this DC power source device, a pair of rectification switching elements (15, 16) are driven in synchronization with switching operation of a pair of main switching elements (2, 3) to produce the DC output between the junction of first and second secondary windings (5b, 5c) of transformer 5 and the junction of a pair of rectification switching elements (15, 16). Timer means (19, 20) counts output time of detection signal from polarity detectors (17, 18) until electric current through one of rectification switching elements (15, 16) comes to zero, and turns the other of rectification switching elements (15, 16) off at the time of or around termination of the counted time so that timer means (19, 20) can reliably turn rectification switching elements (15, 16) off during the conductive period of forward electric current flow for efficient synchronous rectification.

EFFECT OF INVENTION

According to the present invention, rectification switching elements are positively turned off during the conductive period for forward electric current flow to effectively perform the synchronous rectification with less loss and improvement in power conversion efficiency.

EXPLANATION OF SYMBOLS

1 . . . a DC power supply, 2, 3 . . . main MOS-FETs (main switching elements), 4 . . . a resonance reactor, 5 . . . a transformer, 5a . . . a primary winding, 5b . . . a first secondary winding, 5c . . . a second secondary winding, 6 . . . a current-resonant capacitor, 7 . . . a voltage-resonant capacitor, 8, 9 . . . rectification diodes, 10 . . . an output smoothing capacitor, 11 . . . an electric load, 12 . . . an output voltage detector, 13 . . . a photo-coupler, 14 . . . a control circuit, 15, 16 . . . rectification MOS-FETs (rectification switching elements), 17, 18 . . . conduction detectors (polarity detectors), 19, 20 ... timer circuits (timer means), 21, 22 ... first and second counters, 23, 24 ... first and second drive signal generators, 25, 26 ... first and second drive circuits, 27 ... an oscillator, 49 ... an up counter circuit, 50, 51 ... first and second latch circuit, 52, 53 ... first and second subtraction circuits, 54, 55 ... first and second comparators, 56, 57 ... first and second light load detectors, 62 ... a synchronous rectification control IC, 63, 64 ... first and second charge circuits, 65, 66 ... first and second discharge circuits, 67, 68 ... first and second capacitors for timer, 69, 70 ... first and second normal power supplies, 71, 72 ... first and second comparators, 73, 74 ... first and second AND gates, 83, 84 ... third and fourth normal power supplies, 85, 86 ... third and fourth comparators, 87, 88 ... first and second RS flip flops, 89, 90 ... first and second reset circuits, 94, 95 ... first and second sampling pulse generators, 96, 97 ... first and second sample and hold circuits.

BEST MODE FOR CARRYING OUT THE INVENTION

Seven embodiments of the DC power source device according to the present invention are described hereinafter in connection with FIGS. 1 to 19 of the drawings. Same reference symbols as those in FIG. 20 are applied to denote substantially similar components in FIGS. 1 to 19 to those in FIG. 20, and explanation thereon is omitted.

Figure 1:
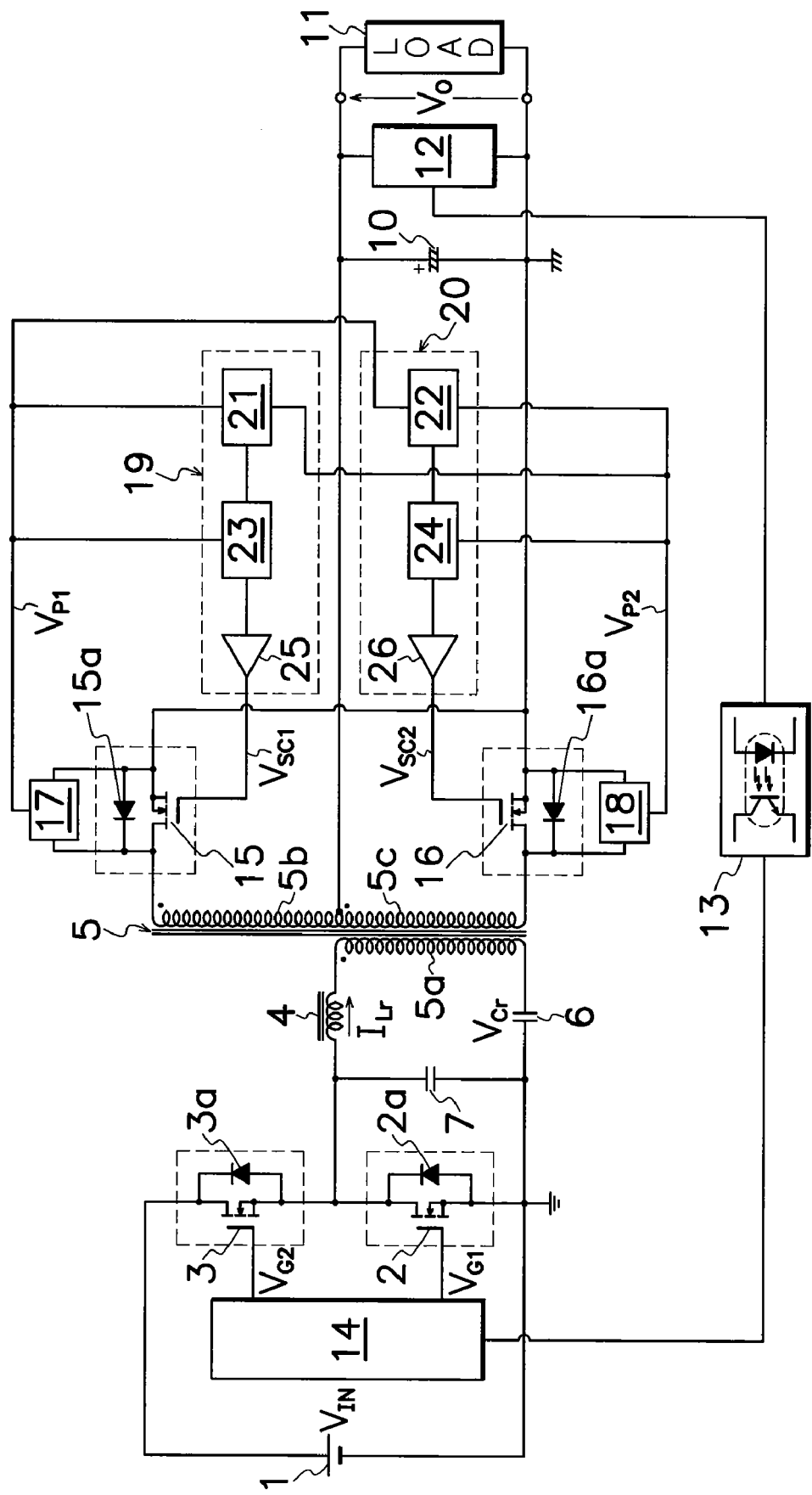
[FIG. 1] An electric circuit diagram showing a first embodiment of a DC power source device according to the present invention.
Figure 20:
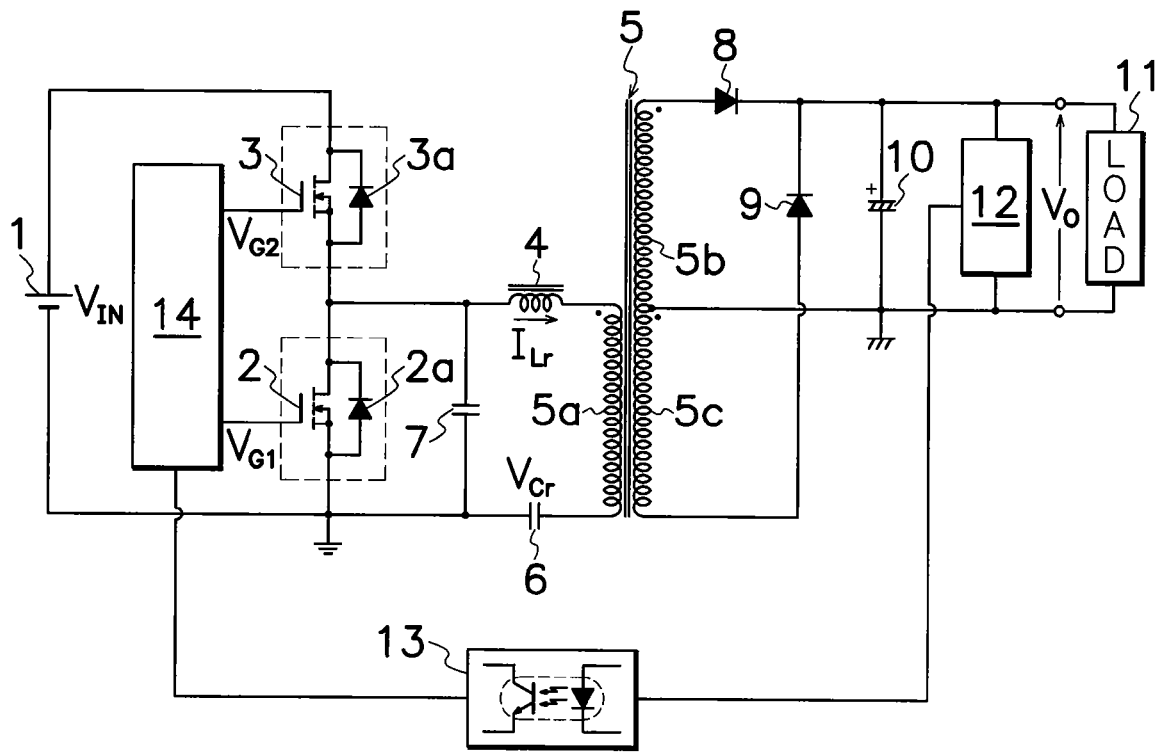
[FIG. 20] An electric circuit diagram showing a prior art DC power source device.

The DC power source device shown in FIG. 1 according to a first embodiment of the present invention is different from prior art one shown in FIG. 20 in that the former DC power source device comprises rectification MOS-FETs 15 and 16 as rectification switching elements connected in exchange for a pair of rectification diodes 8 and 9 in FIG. 20, conduction detectors 17 and 18 as polarity detectors for producing conduction detecting signals $V_{P1}$, $V_{P2}$ when electric current flows through rectification MOS-FETs 15 and 16, and timer circuits 19 and 20 as timer means for counting output time of detection signal $V_{P1}$, $V_{P2}$ from conduction detectors 17, 18 until electric current through one of rectification MOS-FETs 15, 16 comes to zero, and turning the other of rectification MOS-FETs 15, 16 off at the time immediately before termination of the counted time. Parasitic diodes 15a and 16a are connected in parallel between drain and source terminals of rectification MOS-FETs 15 and 16. Other configurations in this main circuit are substantially similar to those shown in FIG. 20 except rectification MOS-FETs 15 and 16 connected to a ground terminal.

Figure 2:
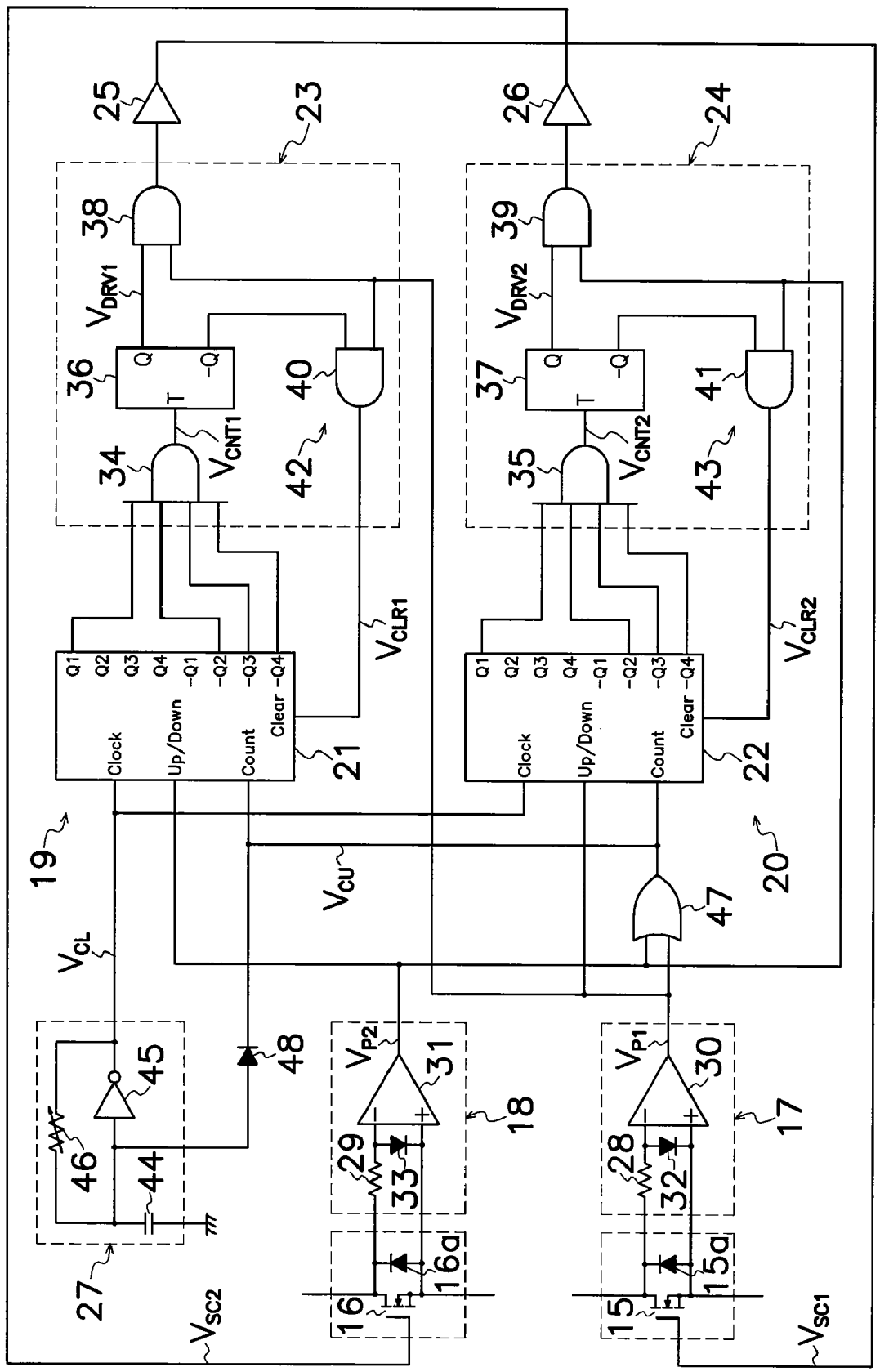
[FIG. 2] A detailed electric circuit diagram of polarity detectors and timer circuits shown in FIG. 1.
Figure 3:
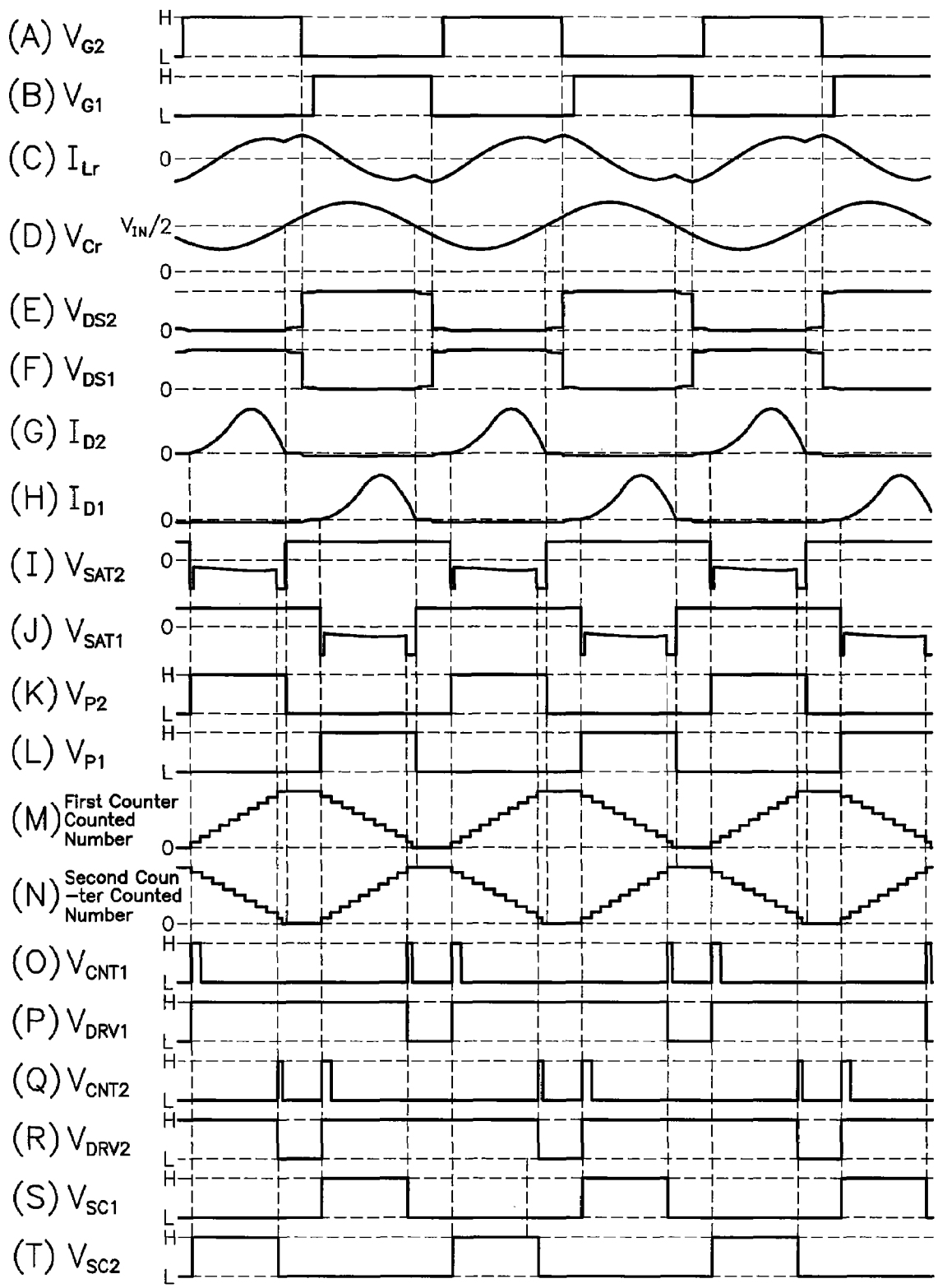
[FIG. 3] A signal waveform diagram showing voltages and electric currents at selected locations in FIGS. 1 and 2.

As shown in FIG. 2, conduction detectors 17 and 18 comprise respectively conduction detecting comparators 30, 31 which have inverted input terminal connected to drain terminals of rectification MOS-FETs 15, 16 through resistors 28, 29 and non-inverted terminal connected to source terminals of rectification MOS-FETs 15, 16, and diodes 32, 33 connected between inverted and non-inverted input terminals of conduction detecting comparators 30, 31. When electric currents $I_{D1}$, $I_{D2}$ shown in FIGS. 3(H) and (G) flow through rectification MOS-FETs 15, 16, conduction detecting comparators 30, 31 produce conduction detecting signals $V_{P1}$, $V_{P2}$ of high voltage level shown in FIGS. 3(L) and (K) because potential at drain terminals is lower than that at source terminals by the forward voltage drop amount through rectification MOS-FETs 15, 16.

As understood from FIG. 2, timer circuits 19, 20 have first and second counters 21, 22 for counting down time while one of rectification MOS-FETs 16, 15 is in the on or conductive condition, and counting up time while the other of rectification MOS-FETs 16, 15 is in the on or conductive condition, first and second drive signal generators 23, 24 for producing an output signal $V_{SC1}$ or $V_{SC2}$ of high voltage level due to an output signal $V_{P1}$ or $V_{P2}$ from one of conduction detectors 17, 18 through an AND gate 38 or 39 and first or second drive circuit 25, 26 to turn one of rectification MOS-FETs 15, 16 on, producing an output signal $V_{SC1}$ or $V_{SC2}$ of low voltage level through first or second drive circuit 25, 26 to turn one of rectification MOS-FETs 15, 16 off when first and second counters 21, 22 count down to 1 in binary digit, and forwarding a reset signal $V_{clr1}$, $V_{clr2}$ to a clear terminal of first and second counters 21, 22 to reset these counters 21, 22; and an oscillation circuit 27 driven in synchronization with output signals $V_{P1}$, $V_{P2}$ from conduction detectors 17, 18 for supplying to clock input terminals of first and second counters 22, 21 clock pulse signals $V_{CL}$ of frequency sufficiently higher than switching frequency of main MOS-FETs 2, 3.

First and second counters 21, 22 start the incremental counting operation when a count signal $V_{CU}$ of high voltage level is forwarded to count input terminals thereof to successively increase or count up the counted binary number developed at output terminals Q1 to Q4 and −Q1 to −Q4 in synchronization with clock pulse signals $V_{CL}$ to clock input terminals. When a low voltage level signal is applied to an up/down input terminal, first and second counters 21, 22 start the decremental counting operation to successively decrease or count down the counted binary number developed at output terminals Q1 to Q4 and −Q1 to −Q4 in synchronization with clock pulse signals $V_{CL}$ to clock input terminals. When a count signal $V_{CU}$ of low voltage level is applied on count input terminals, first and second counters 21, 22 stop the counting up or down operation and retain the counted current number at the time. Output terminals Q1 to Q4 produce a binary counted number with the highest order bit at output terminal Q4 and the least significant bit at output terminal Q1. Output terminals −Q1 to −Q4 produce a complement number of the counted number at output terminals Q1 to Q4. The complement number means a value of the biquadratic or fourth power of 2 minus the counted number at output terminals Q1 to Q4. First and second drive signal generators 23, 24 comprise AND gates 34, 35 of four input terminals for generating output signals $V_{CNT1}$, $V_{CNT2}$ of high voltage level when first and second counters 21, 22 have the counted number 1 in binary digit; T-flip flops (TF/Fs) 36, 37 for alternately switching voltage level between signals $V_{DRV1}$, $V_{DRV2}$ appearing at non-inverted output terminals Q and signals appearing at inverted output terminals −Q each time AND gates 34, 35 give output signals $V_{CNT1}$, $V_{CNT2}$ of high voltage level to input terminals T of TF/Fs 36, 37; AND gates 38, 39 for issuing conjunctive signals of signals $V_{DRV1}$, $V_{DRV2}$ from non-inverted output terminals Q of TF/Fs 36, 37 and signals $V_{P1}$, $V_{P2}$ from conduction detectors 17, 18; and reset circuits 42, 43 which include AND gates 40, 41 for issuing conjunctive signals of signals from inverted output terminals −Q of TF/Fs 36, 37 and signals $V_{P1}$, $V_{P2}$ from conduction detectors 17, 18. Conjunctive signals from AND gates 38, 39 provide synchronous drive signals $V_{SC1}$, $V_{SC2}$ furnished to each gate terminals of rectification MOS-FETs 15, 16 through first and second drive circuits 25, 26. AND gates 40, 41 of reset circuits 42, 43 deliver reset signals $V_{CLR1}$, $V_{CLR2}$ of high voltage level to clear terminals of first and second counters 21, 22 which therefore reset the counted number to zero. Oscillation circuit 27 comprises a capacitor 44 for setting oscillation frequency; an inverting amplifier 45 whose input terminal is connected to capacitor 44; and a variable resistor 46 connected between input and output terminals of inverting amplifier 45 to generate clock pulse signals $V_{CL}$ to clock input terminals of first and second counters 21, 22. A junction of capacitor 44 and variable resistor 46 is connected to count input terminals of first and second counters 21, 22 through a diode 48. At the same time, alternative conduction detecting signals $V_{P1}$, $V_{P2}$ from conduction detectors 17, 18 are supplied to count input terminals of first and second counters 21, 22 through an OR gate 47. Consequently, when conduction detectors 17, 18 produce conduction detecting signals $V_{P1}$, $V_{P2}$ of both low voltage level, OR gate 47 produces an output signal of low voltage level which makes an input signal of low voltage level to inverting amplifier 45 through diode 48, ceasing operation of oscillation circuit 27. Under the circumstances, when conduction detectors 17, 18 produce conduction detecting signals $V_{P1}$, $V_{P2}$ of high voltage level, OR gate 47 produces an output signal of high voltage level which makes the input signal of high voltage level applied to inverting amplifier 45 so that oscillation circuit 27 can be operated synchronously with conduction detecting signals $V_{P1}$, $V_{P2}$ of high voltage level from conduction detectors 17, 18.

Control circuit 14 provides drive signals $V_{G1}$, $V_{G2}$ shown in FIGS. 3(B) and (A) for respective gate terminals of main MOS-FETs 2, 3. When main MOS-FETs 2 and 3 are respectively in the off and on conditions, resonance current $I_{Lr}$ shown by FIG. 3(C) flows from power supply 1 through main MOS-FET 3, resonance reactor 4, primary winding 5a of transformer 5 and current-resonant capacitor 6. Resonance current $I_{Lr}$ produces voltage $I_{Cr}$ shown in FIG. 3(D) between both ends of current-resonant capacitor 6, and raises voltage applied on primary winding 5a of transformer 5. At this moment, voltages $V_{DS1}$, $V_{DS2}$ shown in FIGS. 3(F) and (E) are applied between drain and source terminals of rectification MOS-FETs 15, 16 which are respectively differently turned off and on. When voltage induced on second secondary winding 5c of transformer 5 rises to DC output voltage $V_O$, electric current flows from second secondary winding 5c through rectification MOS-FET 16 to smoothing capacitor 10 to electrically charge smoothing capacitor 10 and supply DC power to load 11. At the same time, resonance current $I_{Lr}$ begins to flow between resonance reactor 4, primary winding 5a and current-resonant capacitor 6. Then, as voltage on primary winding 5a of transformer 5 begins to reduce, voltage on second secondary winding 5c also begins to drop. When voltage between both ends of second secondary winding 5c diminishes to or below DC output voltage $V_O$, transformer 5 ceases electric power transmission to secondary side, and resonance current $I_{Lr}$ flows through primary circuit of transformer 5 by resonance reactor 4, primary winding 5a of transformer 5 and current-resonant capacitor 6 to accumulate electric energy in current-resonant capacitor 6, resonance reactor 4 and primary winding 5a of transformer 5.

Next, when MOS-FETs 2 and 3 are respectively turned off and on, voltage resonance appears through resonance reactor 4, primary winding 5a of transformer 5 and voltage-resonant capacitor 7 so that voltage between drain and source terminals of main MOS-FETs 2, 3 rises or drops with the potential ramp. At this time, voltage $V_{DS2}$ between drain and source terminals of rectification MOS-FET 16 rises as shown in FIG. 3(E), and adversely, voltage $V_{DS1}$ between drain and source terminals of rectification MOS-FET 15 drops to substantially zero volt as shown in FIG. 3(F).

Moreover, when first MOS-FET 2 is turned on under the off condition of second MOS-FET 3, resonance current $I_{Lr}$ decreasingly flows as shown in FIG. 3(C) through current-resonant capacitor 6, resonance reactor 4 and primary winding 5a of transformer 5 due to discharge of electric energy accumulated in all of these elements, and later, resonance current $I_{Lr}$ flows in the adverse direction. When voltage applied on primary winding 5a of transformer 5 becomes an opposite polarity under the on and off conditions of respectively first and second rectification MOS-FETs 15, 16, and voltage induced on first secondary winding 5b comes to DC output voltage $V_O$, electric current flows from first secondary winding 5b through first MOS-FET 15 to smoothing capacitor 10 to electrically charge capacitor 10 and supply DC power to load 11. When voltage on primary winding 5a of transformer 5 begins to reduce and voltage on first secondary winding 5b drops to or below DC output voltage $V_O$, transformer 5 ceases electric power supply to secondary side, and resonance current $I_{Lr}$ flows through resonance reactor 4, primary winding 5a of transformer 5 and current-resonant capacitor 6 in primary side of transformer 5. Continuation of these operations causes repetition of the alternating on-off operation of main MOS-FETs 2 and 3 with the 50% duty ratio. Voltage detector 12 picks out DC output voltage $V_O$ applied to load 11 to produce detection signals to control circuit 14 through photo-coupler 13. Control circuit 14 modulates pulse frequency of drive signals $V_{G1}$ and $V_{G2}$ supplied to gate terminals of main MOS-FETs 2 and 3 based on detection signals from voltage detector 12 to control the on-off operation of main MOS-FETs 2 and 3 so as to maintain DC output voltage $V_O$ substantially consistent.

When one of rectification MOS-FETs 15, 16 is in the on condition to cause electric current to flow through secondary side of transformer 5, sine wave-like electric current $I_{D1}$, $I_{D2}$ shown in FIGS. 3(H) and (G) flow through rectification MOS-FETs 15, 16 from source to drain terminal. At the time, because potential at drain terminal is lower than that at source terminal by forward voltage drop amount in rectification MOS-FETs 15, 16, voltages $V_{SAT1}$, $V_{SAT2}$ become negative between source and drain terminals in a saturation region of rectification MOS-FETs 15, 16 as shown in FIGS. 3(J) and (I). Thereby, as shown in FIGS. 3(L) and (K), conduction detectors 17, 18, connected in parallel to rectification MOS-FETs 15, 16, produce conduction detecting signals $V_{P1}$, $V_{P2}$ of high voltage level which are forwarded to up/down terminal of second and first counters 22, 21 in timer circuits 24, 32 and to AND gates 38, 39 of first and second drive signal generators 23, 24 as shown in FIG. 2.

Here, when second rectification MOS-FET 16 is in the on condition, and first rectification MOS-FET 15 is in the off condition, sine wave-like electric current $I_{D2}$ flows through rectification MOS-FET 16 as shown in FIG. 3(G). Accordingly, as shown in FIG. 3(K), second conduction detector 18 produces conduction detecting signal $V_{P2}$ of high voltage level to up/down input terminal of first counter 21 and OR gate 47, and as shown in FIG. 3(L), first conduction detector 17 produces conduction detecting signal $V_{P1}$ of low voltage level to up/down input terminal of second counter 22 and OR gate 47 to forward a count signal $V_{CU}$ of high voltage level from OR gate 47 to count input terminals of first and second counters 21, 22. Consequently, first counter 21 in first timer circuit 19 starts a counting up operation to successively or stepwise increase the counted number as shown in FIG. 3(M), while second counter 22 in second timer circuit 20 starts a counting down operation to gradually or stepwise decrease the counted number as shown in FIG. 3(N).

When first counter 21 has counted 1 in binary digit as shown in FIG. 3(M), AND gate 34 in first drive signal generator 23 produces an output signal $V_{CNT1}$ of high voltage level to input terminal T of TF/F 36 to switch output signal $V_{DRV1}$ at non-inverted output terminal Q of TF/F 36 from low to high voltage level which is transmitted to AND gate 38 of first drive signal generator 23. At the same time, as conduction detecting signal $V_{P1}$ of low voltage level is also applied to AND gate 38, synchronous drive signal $V_{SC1}$ of low voltage level is supplied from AND gate 38 through first drive circuit 25 to gate terminal of first rectification MOS-FET 15. Meanwhile, AND gate 35 of second drive signal generator 24 in second timer circuit 20 produces an output signal $V_{CNT2}$ of low voltage level shown in FIG. 3(Q) to input terminal T of TF/F 37 to keep output signal $V_{DRV2}$ of high voltage level shown by FIG. 3(R) at non-inverted output terminal Q. Output signal $V_{DRV2}$ from TF/F 37 is transmitted to AND gate 39 of second drive signal generator 24, and at the same time, AND gate 39 receives conduction detecting signal $V_{P2}$ of high voltage level from second conduction detector 18 so that AND gate 39 develops synchronous drive signal $V_{SC2}$ of high voltage level shown in FIG. 3(T) to second rectification MOS-FET 16 through second drive circuit 26.

Then, when second counter 22 in second timer circuit 20 has counted the decreased number 1 in binary digit shown in FIG. 3(N), AND gate 35 in second drive signal generator 24 produces output signal $V_{CNT2}$ of high voltage level shown in FIG. 3(Q) to switch output signal $V_{DRV2}$ at non-inverted output terminal Q of TF/F 37 from high to low voltage level as shown in FIG. 3(R). Accordingly, AND gate 39 produces synchronous drive signal $V_{SC2}$ of low voltage level shown in FIG. 3(T) to gate terminal of second MOS-FET 16 through second drive circuit 26 to turn second MOS-FET 16 off. Simultaneously with this, TF/F 37 of second drive signal generator 24 produces at inverted output terminal –Q a signal of high voltage level to AND gate 41, and also, coincidentally, second conduction detector 18 sends conduction detecting signal $V_{P2}$ of high voltage level to AND gate 41 which gives a reset signal $V_{CLR2}$ to clear terminal of second counter 22 to reset the counted number of second counter 22 to zero. When electric current $I_{D2}$ flowing through second rectification MOS-FET 16 comes to zero as shown in FIG. 3(G), and second conduction detector 18 switches conduction detecting signal $V_{P2}$ from high to low voltage level as shown in FIG. 3(K), OR gate 47 forwards a count signal $V_{CU}$ of low voltage level to count terminals of first and second counters 21, 22 so that first counter 21 stops counting up to retain the counted number at the time of stoppage as shown in FIG. 3(M).

After that, as first rectification MOS-FET 15 is turned on, sine wave-like electric current $I_{D1}$ flows through first rectification MOS-FET 15 as shown in FIG. 3(H), and first conduction detector 17 produces conduction detecting signal $V_{P1}$ of high voltage level shown in FIG. 3(L). Therefore, OR gate 47 changes count signal $V_{CU}$ from low to high voltage level to count terminals of first and second counters 21, 22, and as a result, conduction detecting signal $V_{P2}$ of low voltage level is applied to up/down terminal of first counter 21, and conduction detecting signal $V_{P1}$ of high voltage level is applied to up/down terminal of second counter 22. This causes first counter 21 in first timer circuit 19 to begin the counting down operation to gradually step down the retained counted number as shown in FIG. 3(M), while second counter 22 in second timer circuit 20 commences the counting up operation to gradually step up the counted number from zero as shown in FIG. 3(N).

When second counter 22 in second timer circuit 20 has counted the counted number 1 in binary digit shown in FIG. 3(N), AND gate 35 in second drive signal generator 24 produces an output signal $V_{CN2}$ of high voltage level to input terminal T of TF/F 37 which therefore shifts the output signal $V_{DRV2}$ at non-inverted output terminal Q from low to high voltage level as shown in FIG. 3(R). Output signal $V_{DRV2}$ of high voltage level from TF/F 37 and output signal $V_{P2}$ of low voltage level from conduction detector 18 are transmitted to AND gate 39 which produces a synchronous drive signal $V_{SC2}$ of low voltage level to gate terminal of second rectification MOS-FET 16 through second drive circuit 26. On the other hand, AND gate 34 in first drive signal generator 23 presents an output signal $V_{CNT1}$ of low voltage level to input terminal T of TF/F 36 in first timer circuit 19 to cause TF/F 36 to retain output signal $V_{DRV1}$ of high voltage level at non-inverted output terminal Q as shown in FIG. 3(P). Output signal $V_{DRV1}$ of high voltage level from TF/F 36 and conduction detecting signal $V_{P1}$ of high voltage level from first conduction detector 17 are both led to AND gate 38 in first drive signal generator 23 which therefore offers a synchronous drive signal $V_{SC1}$ of high voltage level to gate terminal of first rectification MOS-FET 15 through first drive circuit 25.

Subsequently, when first counter 21 in first timer circuit 19 has counted the decreased number 1 in binary digit shown in FIG. 3(M), AND gate 34 in first drive signal generator 23 feeds output signal $V_{CNT1}$ of high voltage level shown in FIG. 3(O) to input terminal T of TF/F 36 which therefore switches output signal $V_{DRV1}$ at non-inverted output terminal Q from high to low voltage level so that AND gate 38 provides synchronous drive signal $V_{SC1}$ of low voltage level shown in FIG. 3(S) for gate terminal of first rectification MOS-FET 15 through first drive circuit 25 to turn first rectification MOS-FET 15 off. Concurrently with this, TF/F 36 in first drive signal generator 23 produces at inverted output terminal –Q a signal of high voltage level which is furnished to AND gate 40 in reset circuit 42, while first conduction detector 17 produces conduction detecting signal $V_{P1}$ of high voltage level to AND gate 40 which therefore provides a reset signal $V_{CLR1}$ of high voltage level to clear terminal of first counter 21 to reset the counted number of first counter 21 to zero. When electric current $I_{D1}$ flowing through first rectification MOS-FET 15 comes to substantially zero as shown in FIG. 3(H), and first conduction detector 17 switches conduction detecting signal $V_{P1}$ from high to low voltage level, OR gate 47 produces count signal $V_{CU}$ of low voltage level to count terminals of first and second counters 21, 22 to cause second counter 22 to stop counting up and maintain the counted number shown in FIG. 3(N) at the time of pause.

In the first embodiment, conduction detectors 17, 18 produce respectively detection signals $V_{P1}$, $V_{P2}$ of high voltage level during the conductive period of MOS-FETs 15, 16, in other words, until electric currents $I_{D1}$, $I_{D2}$ flowing through rectification MOS-FETs 15, 16 come to zero, and respective conductive times of MOS-FETs 15, 16 are clocked by the counting up operation of counterpart second and first counters 22, 21 in mating timer circuit 24, 23. Thus, after mating rectification MOS-FET 16, 15 are turned on, mating second and first counters 22, 21 read out the time measured by counting down and count up the time to turn mating rectification MOS-FETs 16, 15 off immediately before termination of the counted time, in other words, when the counted number reaches 1 in binary digit. In this way, first and second counters 21, 22 can serve to positively turn mating rectification MOS-FETs 15, 16 during the conductive period of forward current flow for efficient synchronous rectification. Also, oscillation circuit 27 can provide first and second counters 21, 22 with clock pulse signals $V_{CL}$ of frequency sufficiently higher than switching frequency of main MOS-FETs 2, 3 synchronously with output signals $V_{P1}$, $V_{P2}$ from conduction detectors 17, 18 to exactly time the flowing period of electric currents $I_{D1}$, $I_{D2}$ through rectification MOS-FETs 15, 16.

Figure 4:
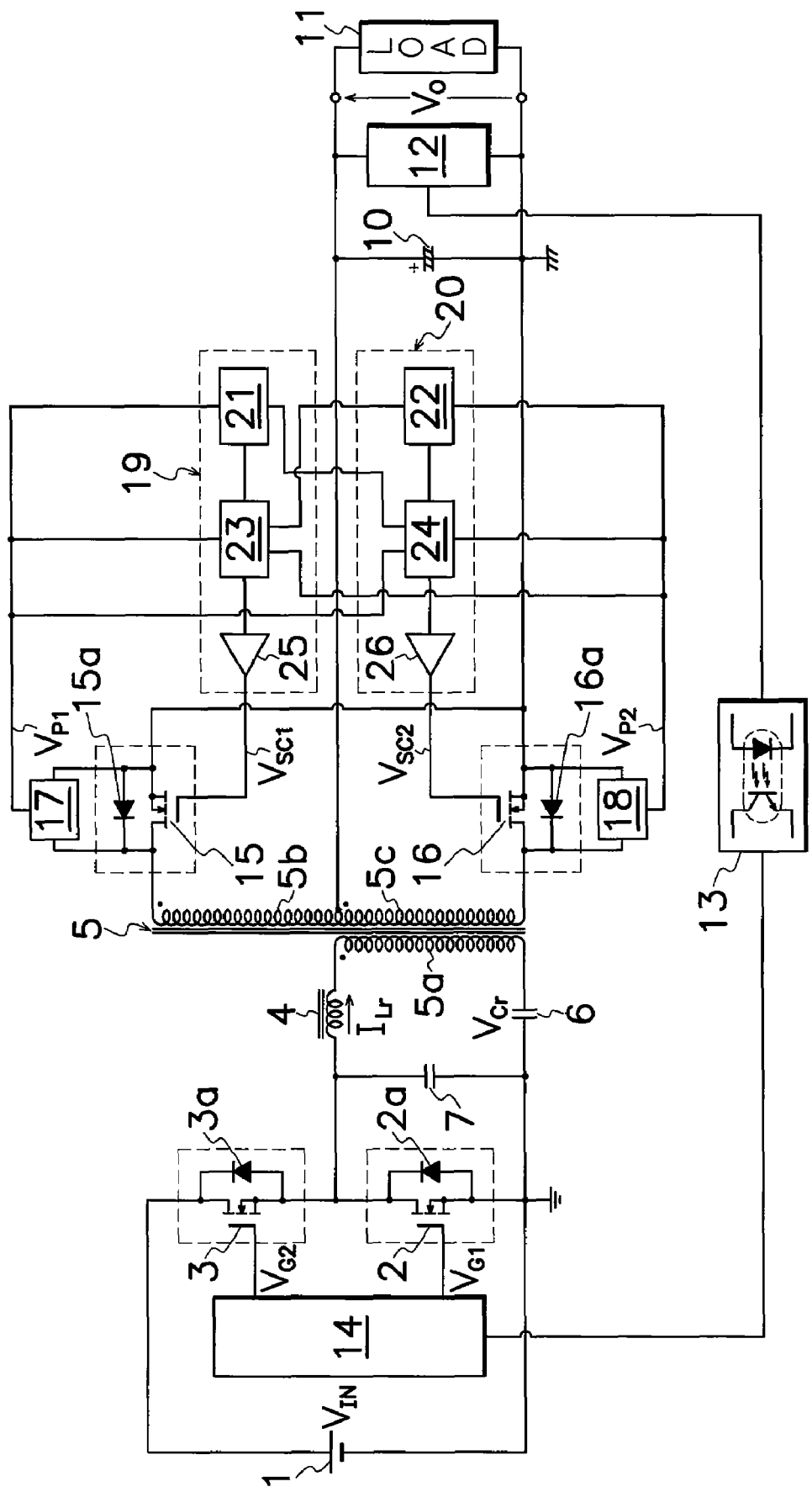
[FIG. 4] An electric circuit diagram showing a second embodiment of the DC power source device according to the present invention.

The foregoing first embodiment according to the invention may be modified. By way of example, FIG. 4 illustrates a second embodiment of the DC power source device according to the present invention which comprises first and second timer circuits 19, 20. First timer circuit 19 comprises a first counter 21 for counting up during the conductive period of first rectification MOS-FET 15; and a first drive signal generator 23 for storing the counted number from a second counter 22 with conduction detecting signal $V_{P2}$ of low voltage level from second conduction detector 18 to simultaneously reset second counter 22, turning first rectification MOS-FET 15 off with conduction detecting signal $V_{P1}$ of high voltage level from first conduction detector 17 to simultaneously cause first counter 21 to count up, and turning first rectification MOS-FET 15 on when first counter 21 times a counted number less than the counted number stored in second counter 22 by a predetermined numerical value. Second timer circuit 20 comprises a second counter 22 for counting up during the conductive period of second rectification MOS-FET 16; and a second drive signal generator 24 for storing the counted number from first counter 21 with conduction detecting signal $V_{P1}$ of low voltage level from first conduction detector 17 to simultaneously reset first counter 21, turning second rectification MOS-FET 16 on with conduction detecting signal $V_{P2}$ of high voltage level from second conduction detector 18 to simultaneously cause second counter 22 to count up, and turning second rectification MOS-FET 16 off when second counter 22 times a counted number less than the counted number stored in first counter 21 by a predetermined numerical value.

Figure 5:
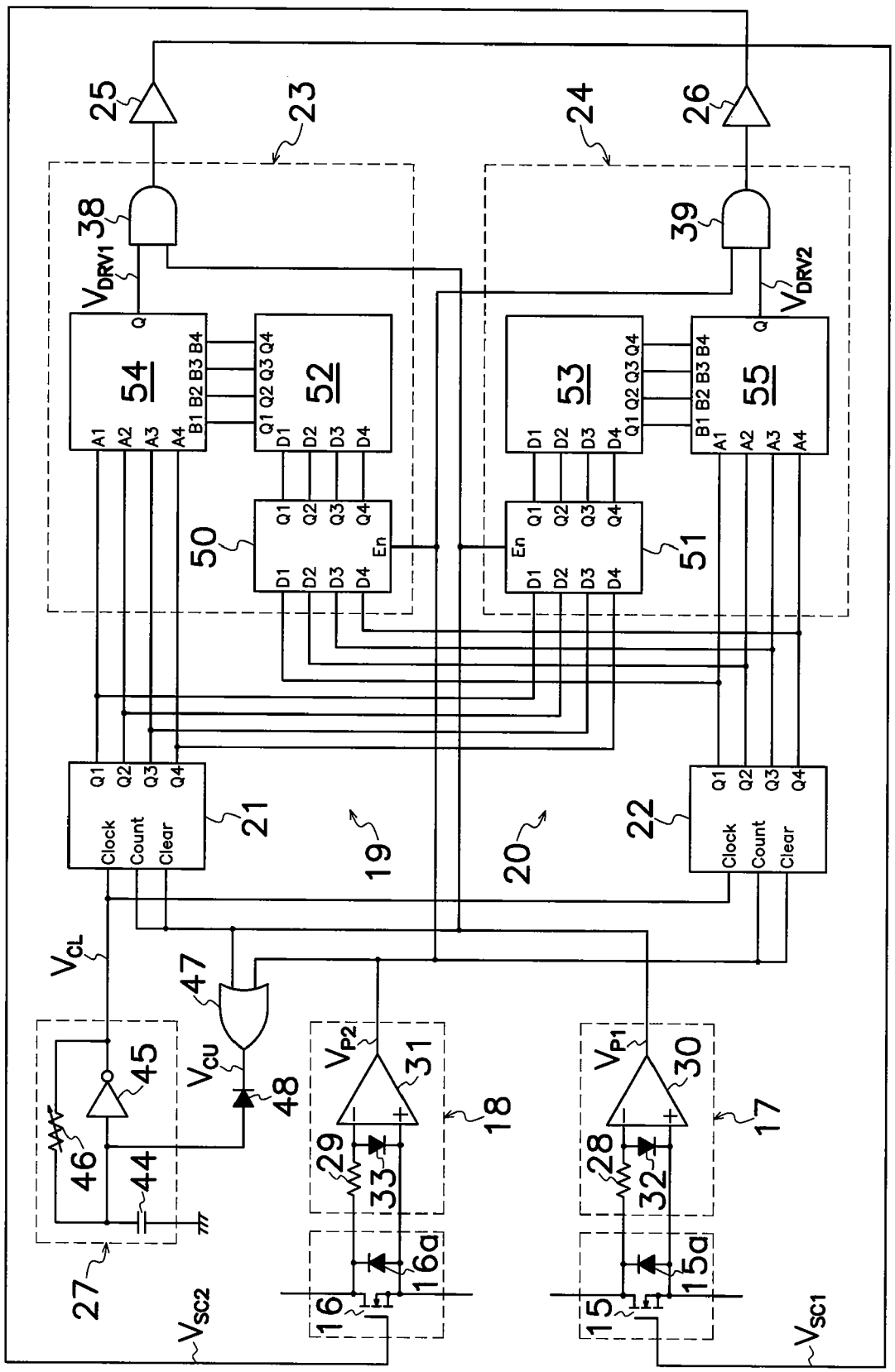
[FIG. 5] A detailed electric circuit diagram of polarity detectors and timer circuits shown in FIG. 4.

First and second conduction detectors 17, 18 shown in FIG. 5 produce output signals $V_{P1}$, $V_{P2}$ of high voltage level to count input terminal of first and second counters 21, 22 which therefore increasingly count up clock pulse signals $V_{CL}$ forwarded from oscillation circuit 27 to clock input terminal to deliver incrementally counted signals in binary digit at count output terminals Q1 to Q4 synchronously with clock pulse signals $V_{CL}$. First and second conduction detectors 17, 18 produce output signals $V_{P1}$, $V_{P2}$ of low voltage level to clear terminals of first and second counters 21, 22 which therefore reset counted number at count output terminals Q1 to Q4 to zero. Also, when conduction detectors 17, 18 produce output signals $V_{P1}$, $V_{P2}$ of both low voltage level, OR gate 47 generates alternative output $V_{CU}$ of low voltage level to give an input signal of low voltage level to inverting amplifier 45 through diode 48 and thereby stop operation of oscillation circuit 27 in order to drive oscillation circuit 27 synchronously with output signals $V_{P1}$, $V_{P2}$ from first and second conduction detectors 17, 18.

As shown in FIG. 5, first and second drive signal generators 23, 24 respectively comprise first and second latch circuits 50, 51; first and second subtracting circuits 52, 53; first and second comparators 54, 55; and AND gates 38, 39. First and second latch circuits 50, 51 have data input terminals D1 to D4 for receiving the counted number forwarded from second and first counters 22, 21 to retain the counted number in synchronization with trailing edge of output signals $V_{P2}$, $V_{P1}$ imparted from conduction detectors 18, 17 to enable terminals En of latch circuits 50, 51 and data output terminals Q1 to Q4 for reading out the counted number. First and second subtracting circuits 52, 53 have data input terminals D1 to D4 for receiving the counted number from first and second latch circuits 50, 51 to subtract 1 in binary digit from the counted number, and data output terminals Q1 to Q4 for reading out the reduced counted number. First and second comparators 54, 55 have comparative data input terminals A1 to A4 for receiving the counted number from first and second counters 21, 22, reference data input terminals B1 to B4 for receiving the counted number from first and second subtracting circuits 52, 53 and a signal output terminal Q for presenting output signals $V_{DRV1}$, $V_{DRV2}$ of low voltage level when the counted number from comparative data input terminals A1 to A4 is equal to that from reference data input terminals B1 to B4.

AND gates 38, 39 produce conjunctive signals of output signals $V_{DRV1}$, $V_{DRV2}$ from first and second comparators 54, 55 and output signals $V_{P1}$, $V_{P2}$ from conduction detectors 17, 18. Other configurations in FIG. 5 are substantially similar to those in the first embodiment shown in FIGS. 1 to 2.

In the second embodiment, synchronously with trailing edge of output signal $V_{P2}$ from second conduction detector 18, first latch circuit 50 can maintain the counted number from second counter 22, and second counter 22 can be reset through OR gate 47. Also, output signal $V_{P1}$ of high voltage level from first conduction detector 17 can be used to turn first rectification MOS-FET 15 on and cause first counter 21 to count up, and turn first rectification MOS-FET 15 off, when the counted number of first counter 21 is smaller than the counted number retained in first latch circuit 50 by 1 in binary digit. Similarly, synchronously with trailing edge of output signal $V_{P1}$ from first conduction detector 17, second latch circuit 51 can maintain the counted number from first counter 21, and first counter 21 is reset through OR gate 47. Also, output signal $V_{P2}$ of high voltage level from second conduction detector 18 can be used to turn second rectification MOS-FET 16 on and cause second counter 22 to count up, and turn second rectification MOS-FET 16 off through second drive circuit 26, when counted number of second counter 22 is smaller than the counted number retained in second latch circuit 51 by 1 in binary digit. In this way, the second embodiment also can certainly turn rectification MOS-FETs 15, 16 off during the conductive period of forward electric current flow to efficiently perform the synchronous rectification in a similar fashion to the first embodiment.

Figure 6:
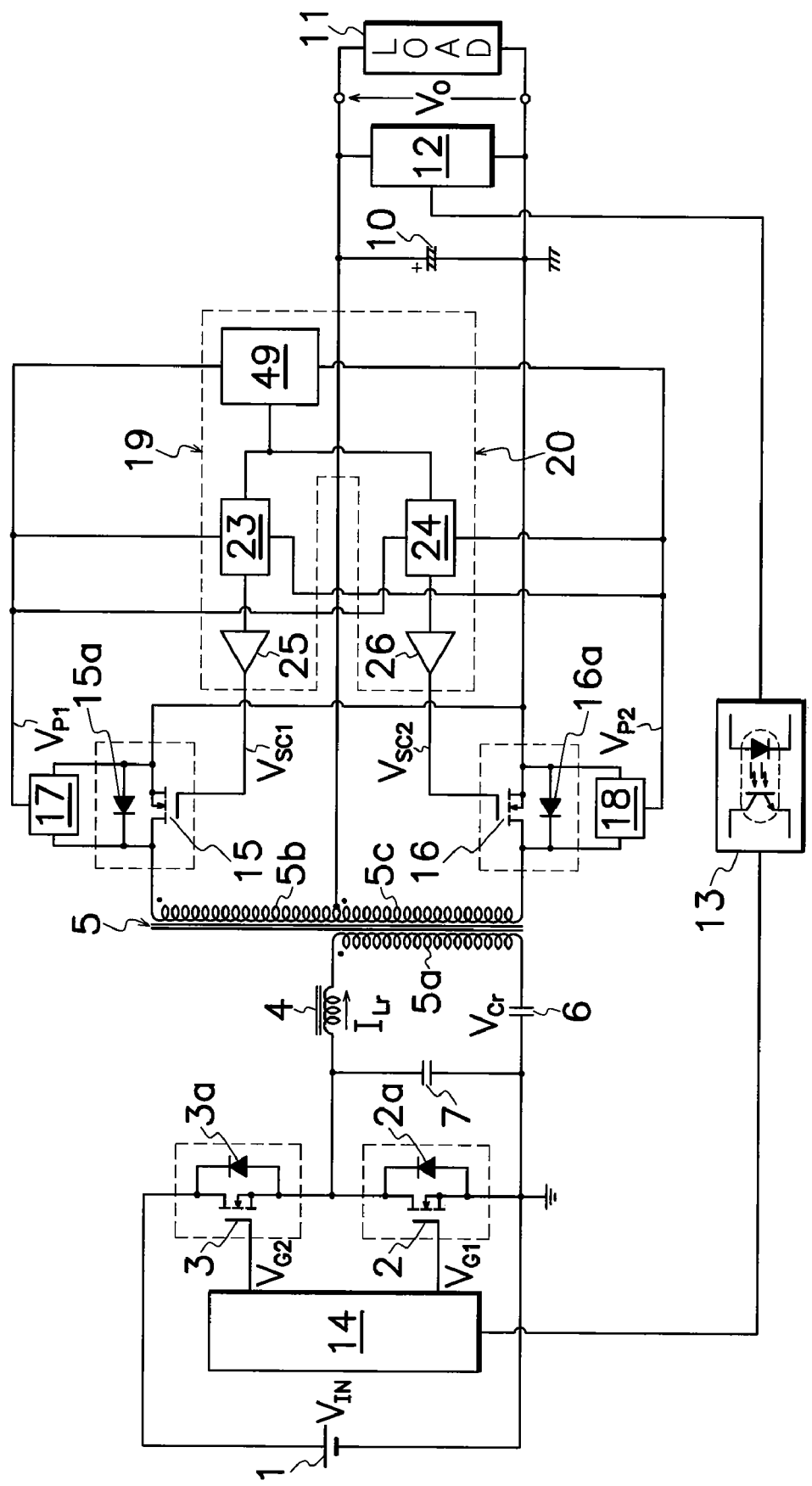
[FIG. 6] An electric circuit diagram showing a third embodiment of the DC power source device according to the present invention.

The second embodiment may be modified as shown in FIG. 6. Specifically, a third embodiment of the DC power source device according to the present invention shown in FIG. 6 utilizes a single up-counter 49 in lieu of first and second counters 21, 22 shown in FIG. 4. Up-counter 49 indicated in FIG. 7 sequentially increases the counted number in binary digit presented at output terminals Q1 to Q4 in synchronization with clock pulse signals $V_{CL}$ received at clock input terminal from oscillation circuit 27 when OR gate 47 produces the alternative signal $V_{CU}$ of high voltage level to count terminal of up-counter 49 with output signals $V_{P1}$, $V_{P2}$ of both high voltage level from first and second conduction detectors 17, 18. Up-counter 49 resets the counted number at output terminals Q1 to Q4 to zero when OR gate 47 produces the alternative signal $V_{CU}$ of low voltage level to clear terminal of up-counter 49.

Figure 7:
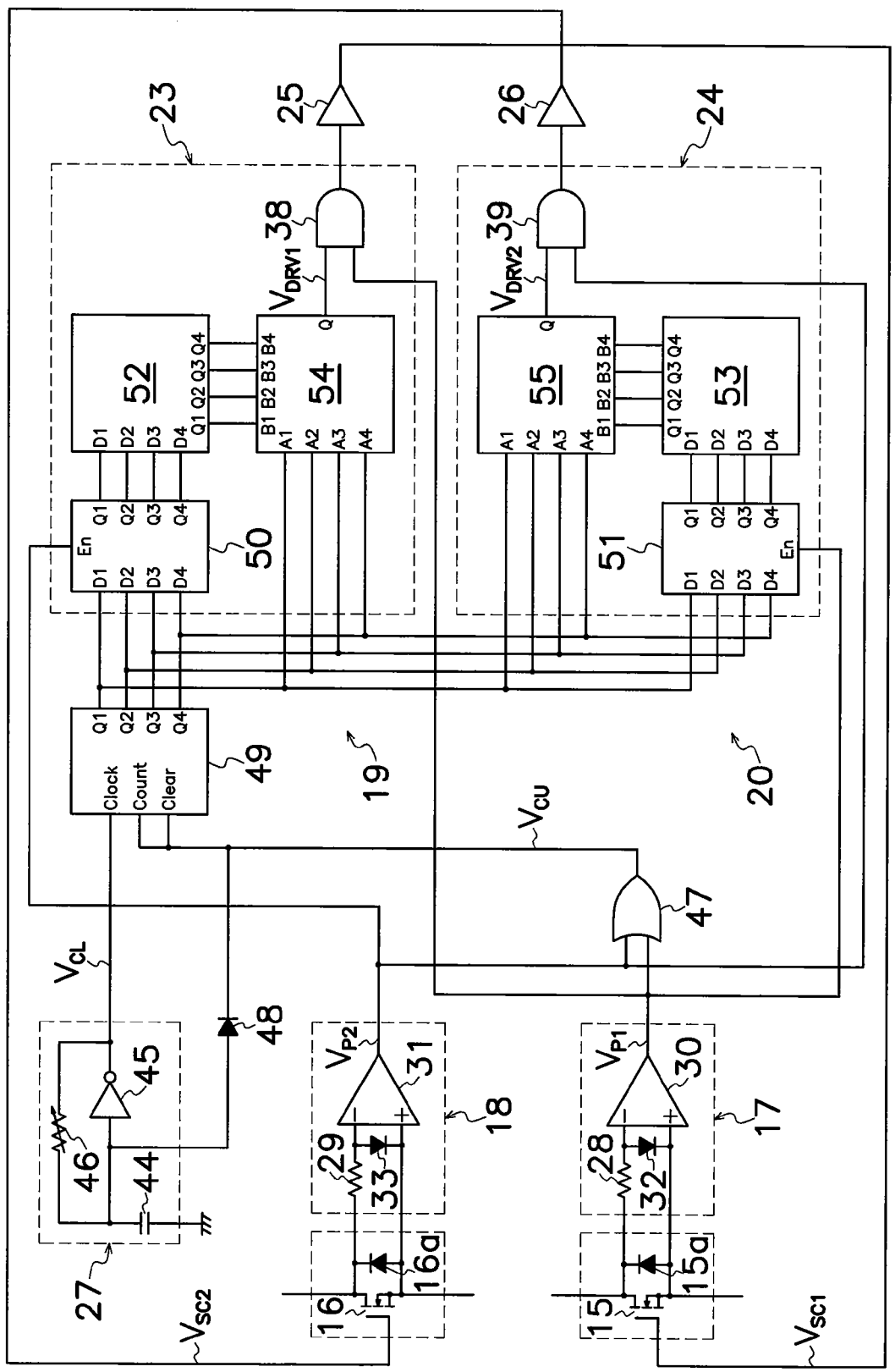
[FIG. 7] A detailed electric circuit diagram of polarity detectors and timer circuits shown in FIG. 6.

As understood from FIG. 7, first and second drive signal generators 23, 24 comprise first and second latch circuits 50, 51 for retaining the counted number received at data input terminals D1 to D4 from up-counter 49 in synchronization with trailing edge of output signals $V_{P2}$, $V_{P1}$ from second and first conduction detectors 18, 17 to an enable terminal En for latch circuits 50, 51 to produce the retained counted number at data output terminals Q1 to Q4; first and second subtracting circuits 52, 53 having data input terminals D1 to D4 for receiving the counted number from first and second latch circuits 50, 51 to subtract 1 in binary digit from the counted number, and data output terminals Q1 to Q4 for presenting the deducted counted number; first and second comparators 54, 55 having comparative data input terminals A1 to A4 for receiving the counted number from up-counter 49, reference data input terminals B1 to B4 for receiving the deducted counted number from subtracting circuits 52, 53 and signal output terminal Q for presenting output signals $V_{DRV1}$, $V_{DRV2}$ of low voltage level when the counted number at comparative data input terminals A1 to A4 is equal to the deducted counted number at reference data input terminals B1 to B4; and AND gates 38, 39 for producing conjunctive signals of output signals $V_{DRV1}$, $V_{DRV2}$ from first and second comparators 54, 55 and output signals $V_{P1}$, $V_{P2}$ from conduction detectors 17, 18. Other configurations are substantially similar to those shown in FIGS. 4 and 5.

In the third embodiment shown in FIGS. 6 and 7, synchronously with trailing edge of output signal $V_{P2}$ from second conduction detector 18, first latch circuit 50 can retain the counted number from up-counter 49 and up-counter 49 can be reset through OR gate 47. Also, output signal $V_{P1}$ from first conduction detector 17 can be used to turn first rectification MOS-FET 15 on, cause up-counter 49 to count up and turn first rectification MOS-FET 15 off, when the counted number of up-counter 49 is smaller than the counted number retained in first latch circuit 50 by 1 in binary digit. Similarly, synchronously with trailing edge of output signal $V_{P1}$ from first conduction detector 17, second latch circuit 51 can maintain the counted number from up-counter 49, and up-counter 49 can be reset through OR gate 47. Also, output signal $V_{P2}$ of high voltage level from second conduction detector 18 can be used to turn second rectification MOS-FET 16 on and cause up-counter 49 to count up, and turn second rectification MOS-FET 16 off through second drive circuit 26, when counted number of up-counter 49 is smaller than the counted number retained in second latch circuit 51 by 1 in binary digit. In this way, the third embodiment also can steadily turn rectification MOS-FETs 15, 16 off during the conductive period of forward electric current flow for efficiently synchronous rectification in a similar fashion to the second embodiment. Also, the third embodiment employs a single counting circuit unlike the second embodiment for simplified circuit configuration for timer circuits 19, 20.

Figure 8:
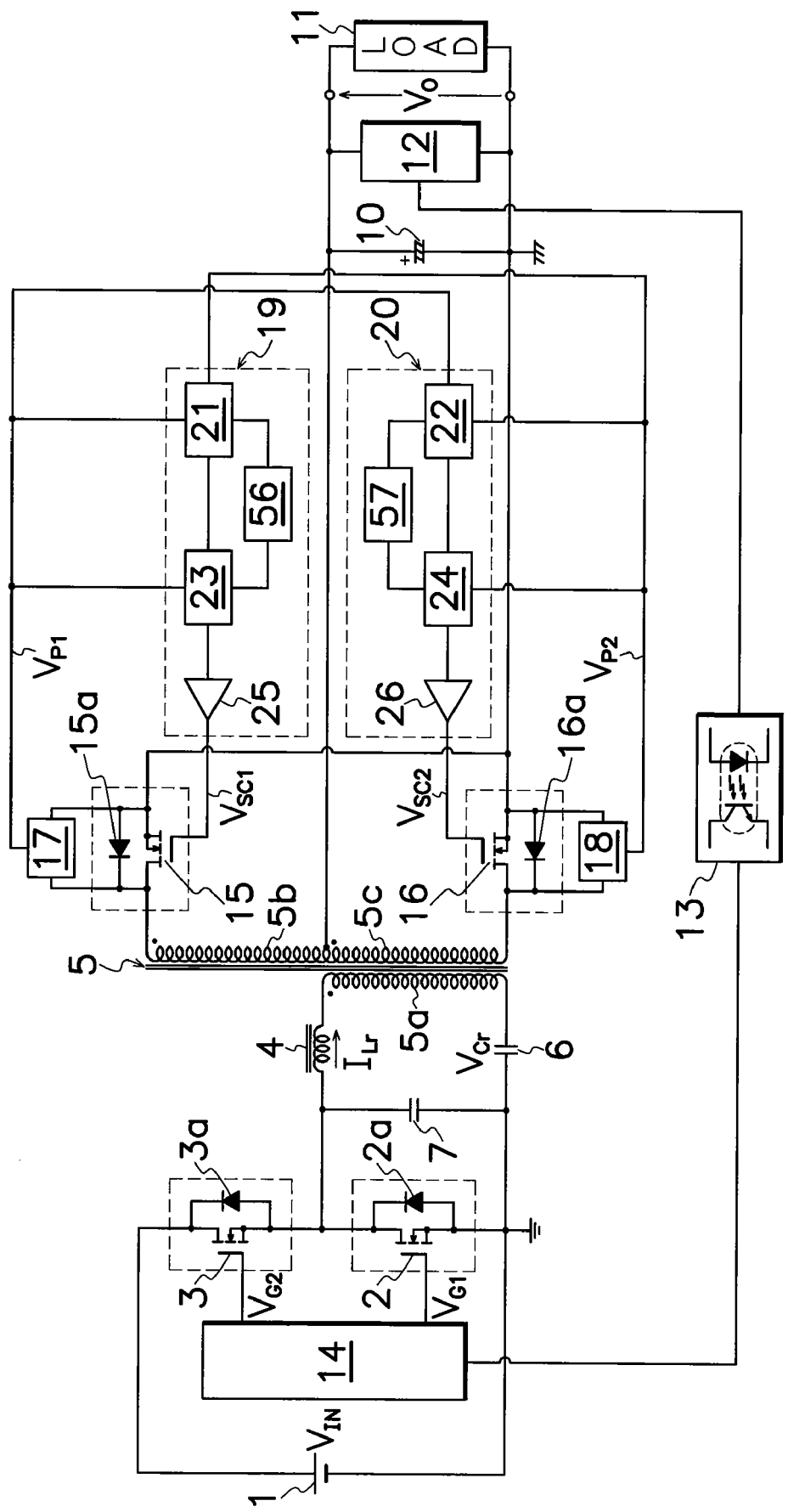
[FIG. 8] An electric circuit diagram showing a fourth embodiment of the DC power source device according to the present invention.
Figure 9:
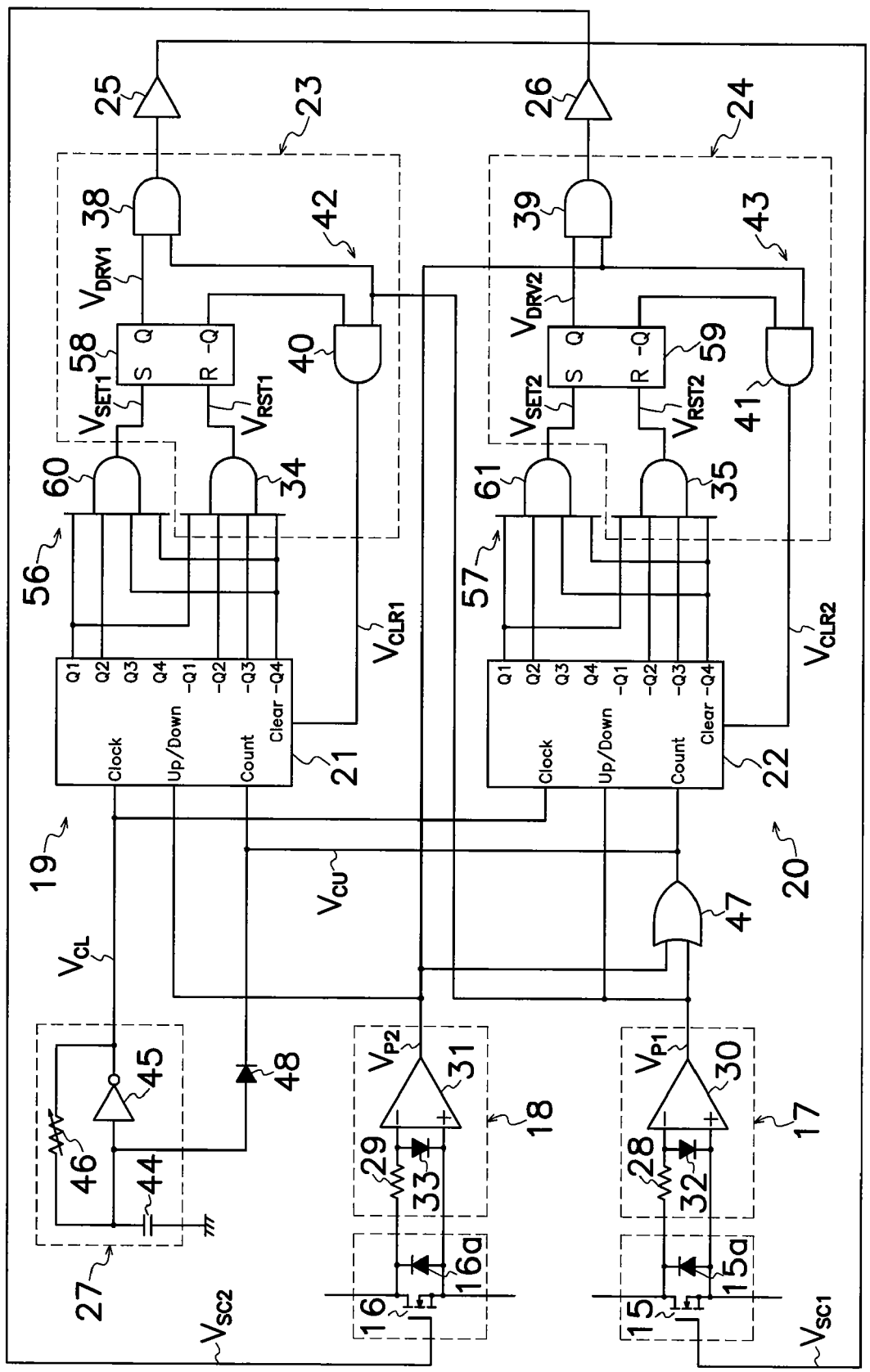
[FIG. 9] A detailed electric circuit diagram of polarity detectors and timer circuits shown in FIG. 8.
Figure 10:
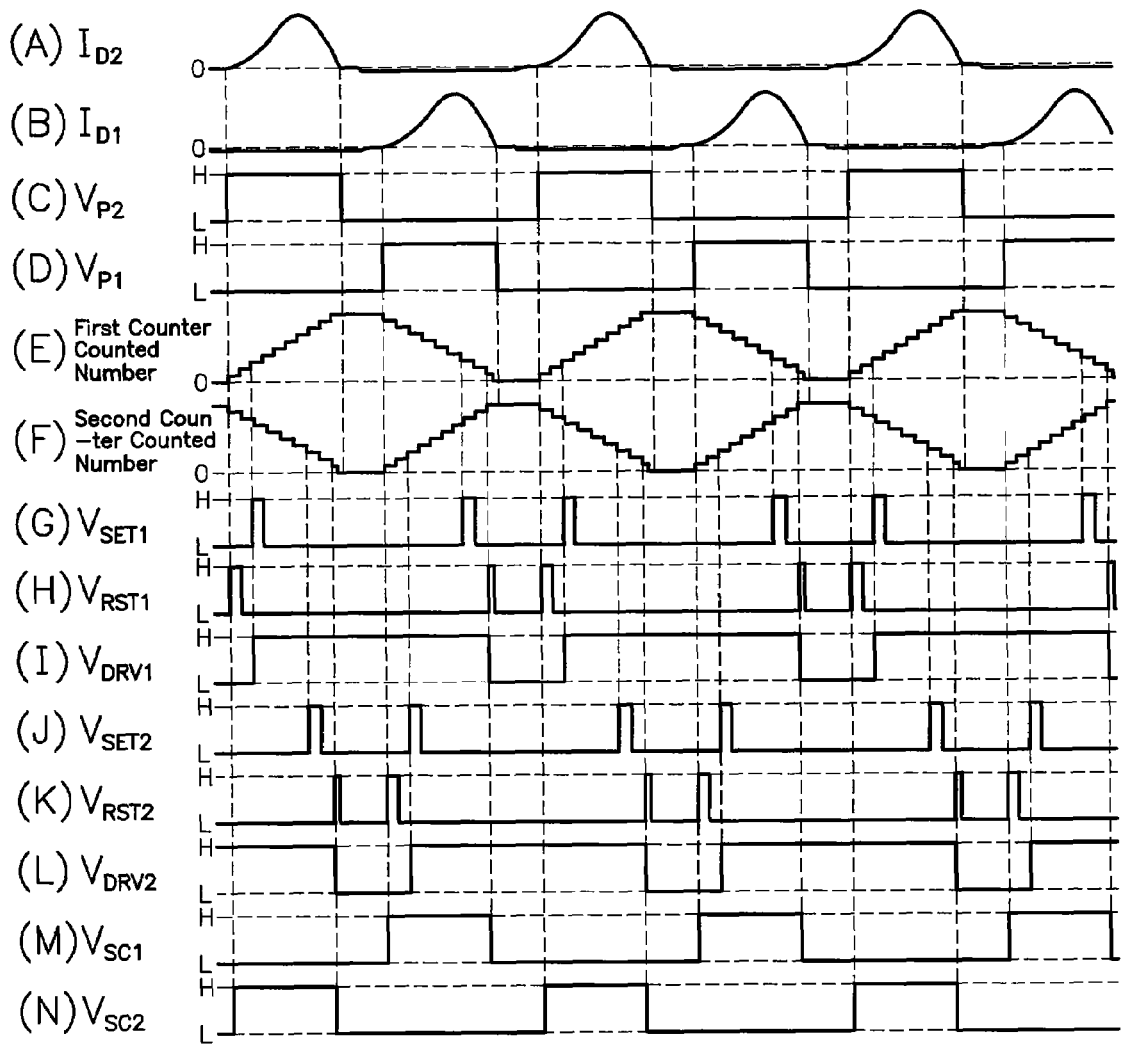
[FIG. 10] A signal waveform diagram showing voltages and electric currents at selected locations in FIG. 9.
Figure 11:
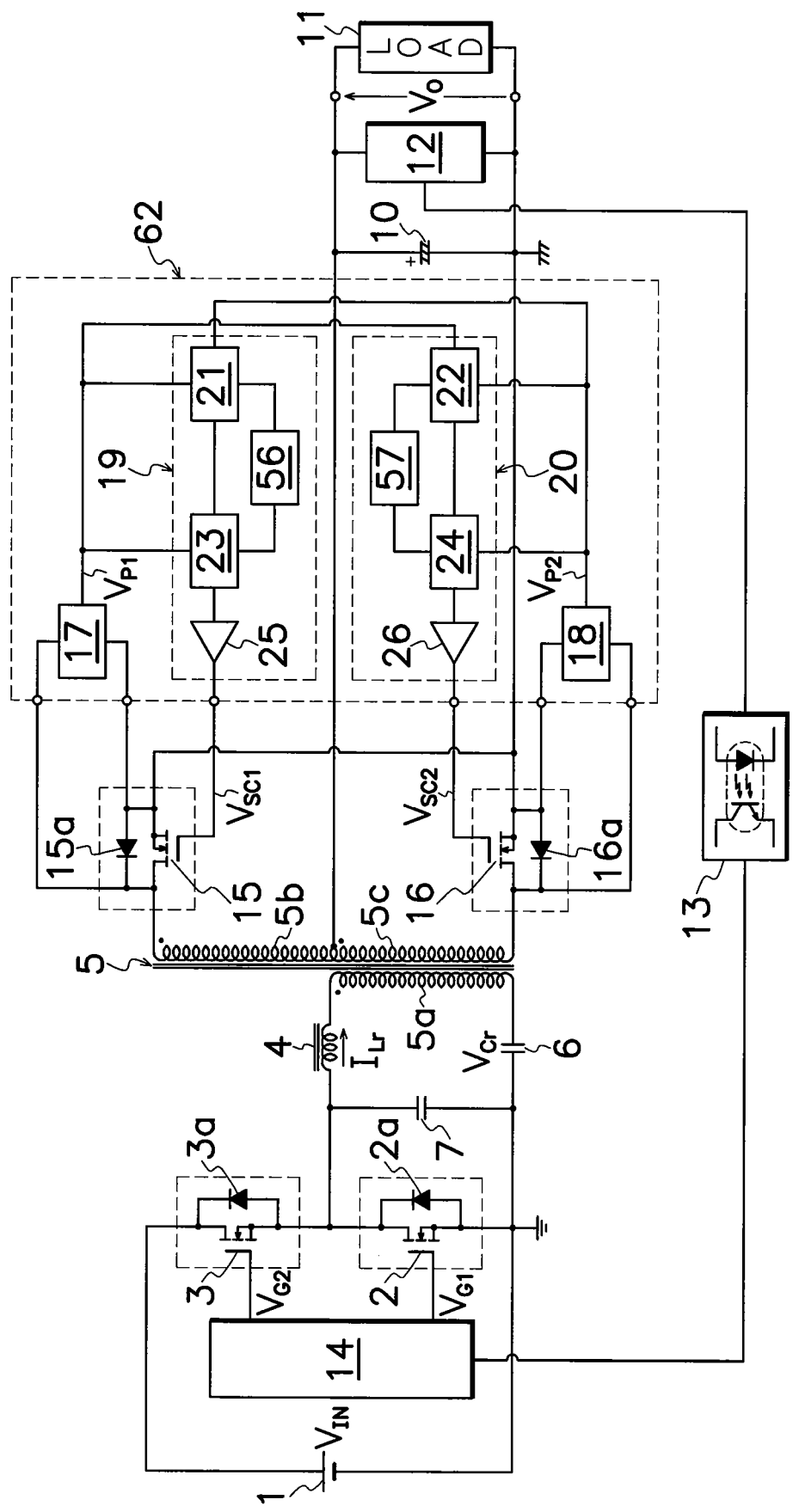
[FIG. 11] An electric circuit diagram showing another embodiment of FIG. 8.

By the way, DC power source device in the first embodiment disadvantageously is defective in that increase in switching frequency of primary main MOS-FETs 2, 3 during the light load period reduces the conductive period of secondary rectification MOS-FETs 15, 16. When electric currents $I_{D1}$, $I_{D2}$ of low peak value pass through rectification MOS-FETs 15, 16 with the reduced conductive period of rectification MOS-FETs 15, 16, considerable or higher driving loss would occur in rectification MOS-FETs 15, 16 than reduced loss by rectification in the secondary circuit of synchronous rectification type. For that reason, a fourth embodiment of the invention shown in FIG. 8 comprises first and second light load detectors 56, 57 connected respectively between first counter 21 and first drive signal generator 23 and between second counter 22 and second drive signal generator 24 in first and second timer circuits 19, 20 of FIG. 1. First and second light load detectors 56, 57 do not provide operation signals $V_{SET1}$, $V_{SET2}$ for first and second drive signal generators 23, 24 until or before first and second counters 21, 22 have counted a predetermined value or over the value. First and second drive signal generators 23, 24 shown in FIG. 8, comprises, as shown in FIG. 9, RS flip flops (RSF/F) 58, 59 in place of TF/F 36, 37 in FIG. 2, and AND gates 34, 35 whose output terminals are connected to reset terminals R of RSF/F 58, 59. First and second light load detectors 56, 57 comprise AND gates 60, 61 of four input type which have four input terminals connected to counted number output terminals Q1, Q2, –Q4 and an output terminal connected to a set terminal of RSF/F 58, 59 as second drive signal generators 23, 24. Other configurations are substantially similar to those in the DC power source device of the first embodiment. In FIGS. 8 and 9, when first and second rectification MOS-FETs 15 and 16 are respectively in the off and on conditions, sine wave-like electric current $I_{D2}$ shown in FIG. 10(A) flows through second rectification MOS-FET 16 to cause conduction detecting signal $V_{P2}$ of high voltage level shown in FIG. 10(C) to be developed from second conduction detector 18 and conduction detecting signal $V_{P1}$ of low voltage level shown in FIG. 10(D) to be developed from first conduction detector 17. Conduction detecting signals $V_{P1}$, $V_{P2}$ developed from first and second conduction detectors 17, 18 are supplied to up/down input terminal of second and first counters 22, 21 and also to OR gate 47 to offer a count signal $V_{CU}$ of high voltage level to count input terminals of first and second counters 21, 22 through OR gate 47. Here, first counter 21 in first timer circuit 19 begins the counting up operation to gradually increase the counted number shown in FIG. 10(E), whereas second counter 22 in second timer circuit 20 begins the counting down operation to gradually decrease the counted number shown in FIG. 10(F).

When first counter 21 has counted 1 in binary digit shown in FIG. 10(E), AND gate 34 in first drive signal generator 23 produces output signal $V_{RST1}$ of high voltage level to reset terminal of RSF/F 58 to maintain output signal $V_{DRV1}$ of low voltage level shown in FIG. 10(I) at non-inverted output terminal Q. Output signal $V_{DRV1}$ of high voltage level from RSF/F 58 and conduction detecting signal $V_{P1}$ of low voltage level from first conduction detector 17 are supplied to AND gate 38 in first drive signal generator 23 to forward synchronous drive signal $V_{SC1}$ of low voltage level shown in FIG. 10(M) from AND gate 38 to gate terminal of first rectification MOS-FET 15 through first drive circuit 25. Also, AND gate 35 in second drive signal generator 24 of second timer circuit 20 forwards output signal $V_{RST2}$ of low voltage level shown in FIG. 10(K) to reset terminal of RSF/F 59 to keep output signal $V_{DRV2}$ of high voltage level shown in FIG. 10(L) at non-inverted output terminal Q of RSF/F 59. Output signal $V_{DRV2}$ of high voltage level from RSF/F 59 and conduction detecting signal $V_{P2}$ of high voltage level from second conduction detector 18 are supplied to AND gate 39 in second drive signal generator 24 to forward synchronous drive signal $V_{SC2}$ of high voltage level shown in FIG. 10(N) from AND gate 39 to gate terminal of second rectification MOS-FET 16 through second drive circuit 26.

When first counter 21 in first timer circuit 19 has counted 3 in binary digit shown in FIG. 10(E), AND gate 60 creates operation signal $V_{ST1}$ of high voltage level shown in FIG. 10(G) to set terminal of RSF/F 58 in first drive signal generator 23 to shift output signal $V_{DRV1}$ at non-inverted output terminal of RSF/F 58 from low to high voltage level. Then, when second counter 22 in second timer circuit 20 has decreased the counted number to 3 in binary digit shown in FIG. 10(F), AND gate 61 in second light load detector 57 produces operation signal $V_{SET2}$ of high voltage level shown in FIG. 10(J) to set terminal of RSF/F 59 in second drive signal generator 24 to maintain output signal $V_{DRV2}$ of high voltage level shown in FIG. 10(L) at non-inverted output terminal Q of RSF/F 59.

Furthermore, when second counter 22 has reduced to 1 in binary digit as shown in FIG. 10(F), AND gate 35 in second drive signal generator 24 produces output signal $V_{RST2}$ of high voltage level to switch output signal $V_{DRV2}$ at non-inverted output terminal Q of RSF/F 59 from high to low voltage level as shown in FIG. 10(L). Therefore, AND gate 39 delivers synchronous drive signal $V_{SC2}$ of low voltage level to gate terminal of second rectification MOS-FET 16 through second drive circuit 26 to turn second rectification MOS-FET 16 off. At the same time, RSF/F 59 in second drive signal generator 24 creates at inverted input terminal –Q a signal of high voltage level which is then sent to AND gate 41 of a reset circuit 43. On the other hand, coincidentally, second conduction detector 18 provides a conduction detecting signal $V_{P2}$ of high voltage level for AND gate 41 which therefore forwards reset signal $V_{CLR2}$ of high voltage level to clear terminal of second counter 22 to reset the counted number in second counter 22 to zero. When electric current $I_{D2}$ of FIG. 10(A) flowing through second rectification MOS-FET 16 comes to zero and second conduction detector 18 switches conduction detecting signal $V_{P2}$ of FIG. 10(C) from high to low voltage level, OR gate 47 produces count signal $V_{CU}$ of low voltage level to count terminal of first and second counters 21, 22 to cause first counter 21 to cease the counting up operation and keep the counted number shown in FIG. 10(E) at the time of the pause.

Then, when first rectification MOS-FET 15 is turned on, sine wave-like electric current $I_{D1}$ shown in FIG. 10(B) flows through first rectification MOS-FET 15 so that first conduction detector 17 produces conduction detecting signal $V_{P1}$ of high voltage level shown in FIG. 10(D). At this moment, OR gate 47 shifts count signal $V_{CU}$ from low to high voltage level to count terminals of first and second counters 21, 22 to supply conduction detecting signal $V_{P2}$ of low voltage level to up/down terminal of first counter 21 and conduction detecting signal $V_{P1}$ of high voltage level to up/down terminal of second counter 22. Accordingly, first counter 21 in first timer circuit 19 starts the counting down operation to gradually decrease the retained counted number as shown in FIG. 10(E), while second counter 22 in second timer circuit 20 starts the counting up operation to gradually increase the counted number from zero as shown in FIG. 10(F).

When second counter 22 in second timer circuit 20 has counted 1 in binary digit shown in FIG. 10(F), AND gate 35 in second drive signal generator 24 transmits output signal $V_{RST2}$ of high voltage level shown in FIG. 10(K) to reset terminal of RSF/F 59 to maintain output signal $V_{DRV2}$ of low voltage level at non-inverted input terminal Q of RSF/F 59. Output signal $V_{DRV2}$ of low voltage level from RSF/F 59 and conduction detecting signal $V_{P2}$ of low voltage level from second conduction detector 18 are forwarded to AND gate 39 in second drive signal generator 24 which therefore produces synchronous drive signal $V_{SC2}$ of low voltage level shown in FIG. 10(N) to gate terminal of second rectification MOS-FET 16 through second drive circuit 26. On the other hand, AND gate 34 in first drive signal generator 23 produces output signal $V_{RST1}$ of low voltage level shown in FIG. 10(H) to reset terminal of RSF/F 58 in first timer circuit 19 to maintain output signal $V_{DRV1}$ of high voltage level shown in FIG. 10(I) at non-inverted output terminal Q of RSF/F 58. Output signal $V_{DRV1}$ of high voltage level from RSF/F 58 and conduction detecting signal $V_{P1}$ of high voltage level from first conduction detector 17 are furnished to AND gate 38 of first drive signal generator 23 to supply synchronous drive signal $V_{SC1}$ of high voltage level shown in FIG. 10(M) from AND gate 38 through first drive circuit 25 to gate terminal of first rectification MOS-FET 15.

When second counter 22 in second timer circuit 20 has counted 3 in binary digit shown in FIG. 10(F), AND gate 61 in second light load detector 57 generates operation signal $V_{SET2}$ of high voltage level shown in FIG. 10(J) to set terminal of RSF/F 59 in second drive signal generator 24 to shift output signal $V_{DRV2}$ shown in FIG. 10(L) at non-inverted output terminal Q of RSF/F 59 from low to high voltage level. After that, when first counter 21 in first timer circuit 19 has decreased to the counted number 3 in binary digit shown in FIG. 10(E), AND gate 60 in first light load detector 56 produces operation signal $V_{SET1}$ of high voltage level shown in FIG. 10(G) to set input terminal of RSF/F 58 in first drive signal generator 23 to keep output signal $V_{DRV1}$ of high voltage level shown in FIG. 10(I) at non-inverted output terminal Q of RSF/F 58.

Then, when first counter 21 in first timer circuit 19 has decreased to the counted number 1 in binary digit shown in FIG. 10(E), AND gate 34 in first drive signal generator 23 produces output signal $V_{RST1}$ of high voltage level shown in FIG. 10(H) to switch output signal $V_{DRV1}$ at non-inverted output terminal Q of RSF/F 58 from high to low voltage level shown in FIG. 10(I), and AND gate 38 produces synchronous drive signal $V_{SC1}$ of low voltage level shown in FIG. 10(M) through first drive circuit 25 to gate terminal of first rectification MOS-FET 15 to turn it off. Simultaneously, RSF/F 58 in first drive signal generator 23 produces a signal of high voltage level at inverted output terminal –Q to AND gate 40, and first conduction detector 17 produces conduction detecting signal $V_{P1}$ of high voltage level to AND gate 40 which therefore generates a reset signal $V_{CLR1}$ of high voltage level to clear input terminal of first counter 21 to reset the counted number in first counter 21 to zero. When electric current $I_{D1}$ flowing through first rectification MOS-FET 15 comes to approximately zero as shown in FIG. 10(B), and first conduction detector 17 switches conduction detecting signal $V_{P1}$ from high to low voltage level as shown in FIG. 10(D), OR gate 47 produces count signal $V_{CU}$ of low voltage level to count terminal of first and second counters 21, 22, and second counter 22 ceases the counting up operation and retains the counted number shown in FIG. 10(F) at the time of pause. Other circuit configurations than the foregoing in the fourth embodiment shown in FIG. 8 are substantially similar to those in the first embodiment shown in FIG. 1.

In the fourth embodiment, as first and second light load detectors 56, 57 produce operation signals $V_{SET1}$, $V_{SET2}$ to first and second drive signal generators 23, 24 with the counted number 3 or more in first and second counters 21, 22 to drive first and second MOS-FETs 15, 16, the conductive period of first and second MOS-FETs 15, 16 is shortened, and first and second MOS-FETs 15, 16 are not operated with the counted number of first and second counters 21, 22 below 3 in binary digit to inhibit drive power consumption and drive loss in rectification MOS-FETs 15, 16 during the light load. Also, the fourth embodiment is beneficial because conduction detectors 17, 18 and timer circuits 19, 20 can be made in a single synchronous rectification control IC 62 shown in FIG. 11 for considerable reduction in mounting space compared to a prior art technique for detecting electric current by a resistor or current transformer for current control.

The foregoing first to fourth embodiments utilize first and second counters 21, 22 in timer circuits 19, 20 for timing the period of electric current $I_{D1}$ or $I_{D2}$ flowing through one of rectification MOS-FETs 15, 16, namely the conductive period of one of rectification MOS-FETs 15, 16 to turn the other of rectification MOS-FETs 15, 16 in accordance with the digitally counted time value. Alternatively, the conductive period of one of rectification MOS-FETs 15, 16 may be counted in an analog fashion as an electrically charged time of a capacitor in timer circuit 19, 20 to turn the other of rectification MOS-FETs 16, 15 on or off in accordance with the discharged time of the charged capacitor. For example, in FIG. 12 indicating a fifth embodiment of DC power source device according to the present invention, timer circuits 19, 20 comprise first and second timer capacitors 67, 68 electrically charged by a constant current from output smoothing capacitor 10 through first and second charge circuits 63, 64 during the conductive period of the other of rectification MOS-FETs 16, 15 and electrically discharged by a constant current through first and second discharge circuit 65, 66 during the conductive period of one of MOS-FETs 15, 16; and first and second drive signal generators 23, 24 for turning one of rectification MOS-FETs 15, 16 on by output signals $V_{P1}$, $V_{P2}$ from first conduction detector 17, 18, and turning one of rectification MOS-FETs 15, 16 off through first and second drive circuits 25, 26 when voltage $V_{C1}$, $V_{C2}$ on first and second timer capacitor 67, 68 reaches reference voltage $V_{R1}$, $V_{R2}$. First and second drive signal generators 23, 24 comprise first and second comparators 71, 72 for comparing voltages $V_{C1}$, $V_{C2}$ on first and second timer capacitors 67, 68 with reference voltages $V_{R1}$, $V_{R2}$ of first and second normal power supplies 69, 70 to produce output signals $V_{CP1}$, $V_{CP2}$ of low voltage level when voltage $V_{C1}$, $V_{C2}$ on first and second timer capacitors 67, 68 is below reference voltage $V_{R1}$, $V_{R2}$; and first and second AND gates 73, 74 for producing conjunctive signals of output signals $V_{P1}$, $V_{P2}$ from conduction detectors 17, 18 and output signals $V_{CP1}$, $V_{CP2}$ of first and second comparators 71, 72. First and second normal power supplies 69, 70 provide reference voltages $V_{R1}$, $V_{R2}$ set as a same value.

Figure 13:
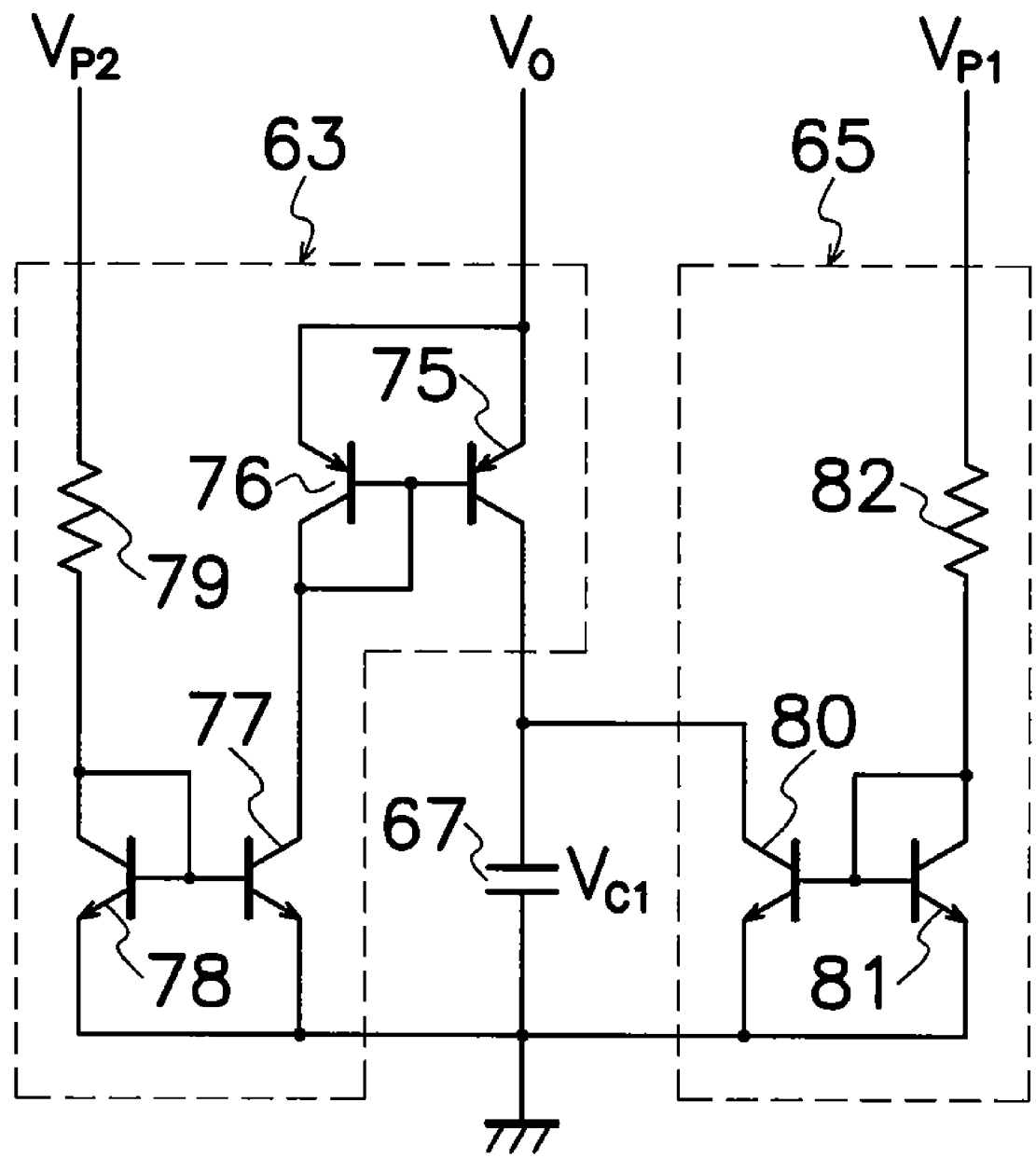
[FIG. 13] A detailed electric circuit diagram showing charge and discharge circuits in FIG. 12.
Figure 14:
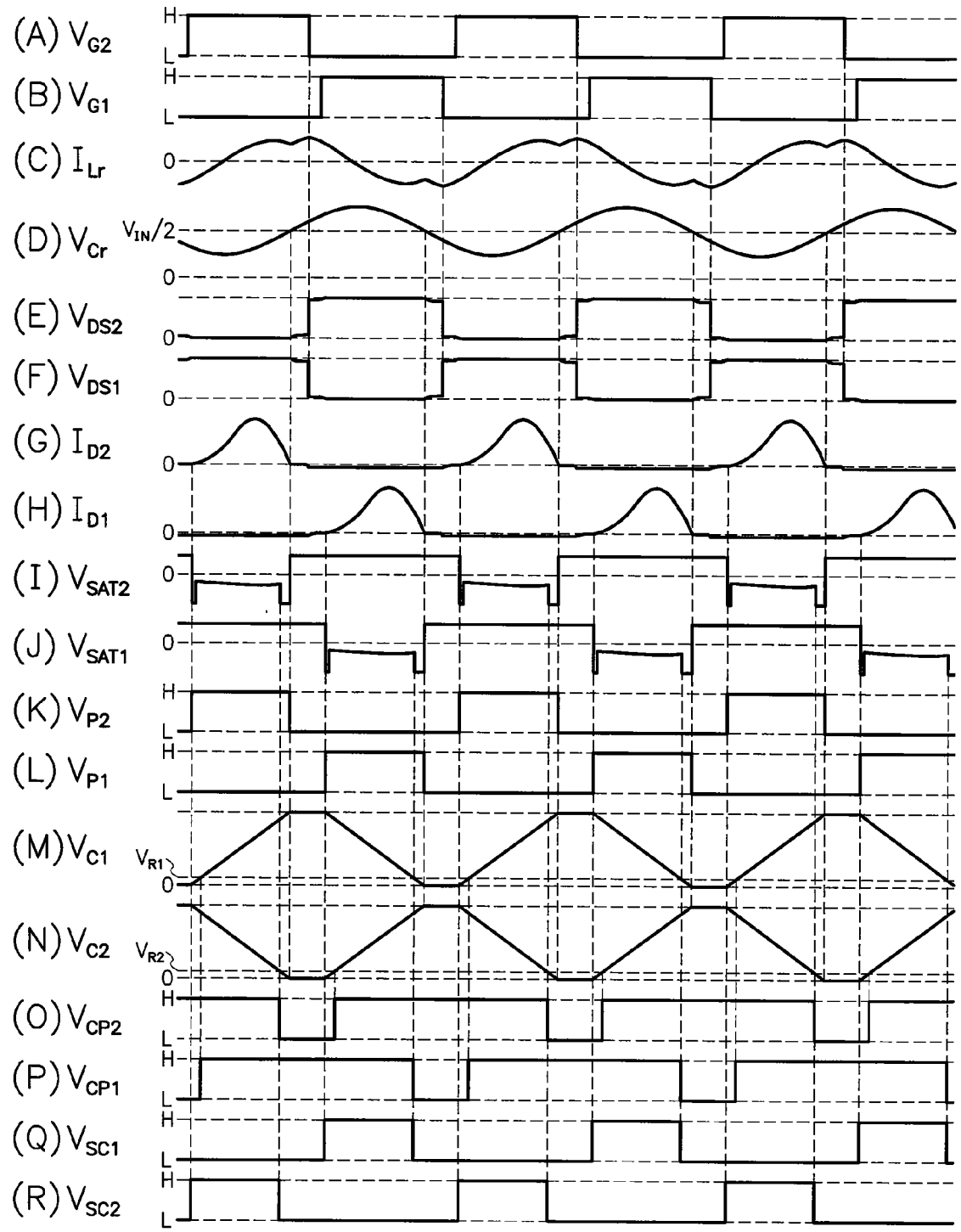
[FIG. 14] A signal waveform diagram showing voltages and electric currents at selected locations in FIG. 12.

As shown in FIG. 13, first charge circuit 63 comprises a first PNP transistor 75 connected between an intermediate tap of first and second secondary windings 5b, 5c of transformer 5 and first timer capacitor 67; a second PNP transistor 76 which has a base terminal connected to base terminal of first PNP transistor 75, an emitter terminal connected to emitter terminal of first PNP transistor 75 and a collector terminal connected to its base terminal; a first NPN transistor 77 which has a collector terminal connected to collector terminal of second PNP transistor 76 and an emitter terminal connected to secondary ground; and a second NPN transistor 78 which has a base terminal connected to base terminal of first NPN transistor 77 and collector terminal of second NPN transistor 78, an emitter terminal connected to emitter terminal of first NPN transistor 77, and a collector terminal connected to output terminal of second conduction detector 18 through a limiting resistor 79 to supply a constant current for first timer capacitor 67. A first discharge circuit 65 comprises a third NPN transistor 80 connected in parallel to first timer capacitor 67; and a fourth NPN transistor 81 which has a base terminal connected to base terminal of third NPN transistor 80 and collector terminal of fourth NPN transistor 81, an emitter terminal connected to emitter terminal of third NPN transistor 80, and a collector terminal connected to output terminal of first conduction detector 17 through a limiting resistor 82 to discharge first timer capacitor 67 with a constant current therefrom. Resistance values of limiting resistors 79, 82 in first charge and discharge circuits 63, 65 are equal to each other. Configurations of second charge and discharge circuits 64, 66 are the same as those in first charge and discharge circuits 63, 65 shown in FIG. 13, and other configurations are substantially similar to those in DC power source of the first embodiment shown in FIG. 1.

Figure 12:
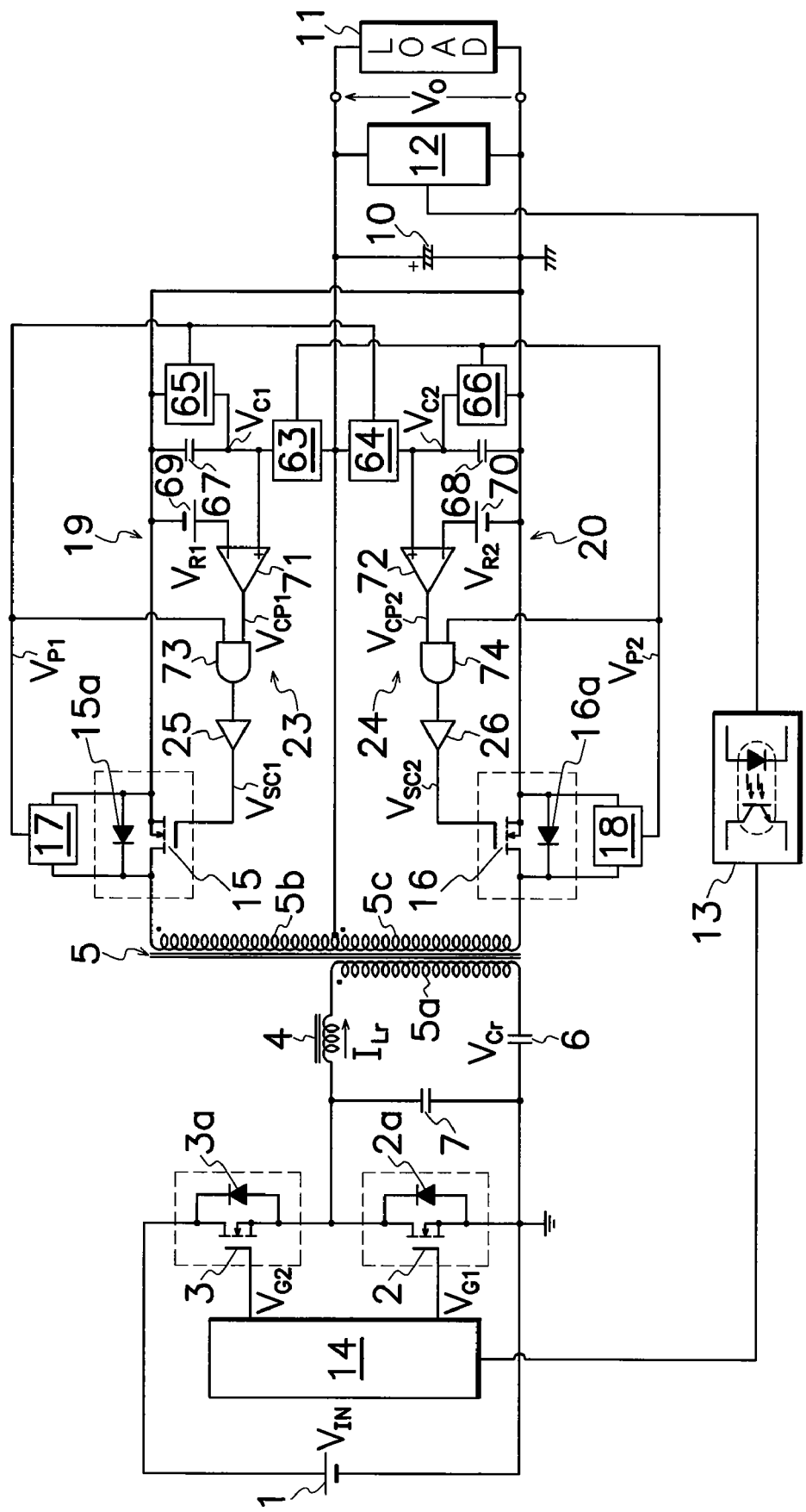
[FIG. 12] An electric circuit diagram showing a fifth embodiment of the present invention.

In FIG. 12, control circuit 14 provides drive signals $V_{G1}$, $V_{G2}$ shown in FIGS. 14(B) and (A) for each gate terminal of primary main MOS-FETs 2, 3. When first main MOS-FET 2 is in the off condition and second main MOS-FET 3 is in the on condition, resonance current $I_{Lr}$ shown in FIG. 14(C) flows through resonance reactor 4, primary winding 5a of transformer 5 and current-resonant capacitor 6 to induce voltage $I_{Cr}$ shown in FIG. 14(D) between both ends of current-resonant capacitor 6 thereby causing voltage on primary winding 5a of transformer 5 to rise. During this period of time, voltages $V_{DS1}$, $V_{DS2}$ shown in FIGS. 14(F) and (E) are applied between drain and source terminals of secondary rectification MOS-FETs 15, 16 to turn first rectification MOS-FET 15 off and second rectification MOS-FET 16 on. When voltage induced on second secondary winding 5c of transformer 5 is elevated to DC output voltage $V_O$, the voltage is clamped at DC output voltage $V_O$, and electric current flows through second rectification MOS-FET 16 to charge output smoothing capacitor 10 and supply DC power to load 11 during which resonance current $I_{Lr}$ flows in the primary circuit of transformer 5 due to resonance reactor 4 and current resonant capacitor 6. When voltage applied on primary winding 5a of transformer 5 begin decreasing, and voltage applied on second secondary winding 5c drops below DC output voltage $V_O$, power supply to secondary side of transformer 5 is ceased, and resonance current $I_{Lr}$ flows in primary side of transformer 5 due to resonance reactor 4, primary winding 5a of transformer 5 and current-resonant capacitor 6 to accumulate electromagnetic energy in current-resonant capacitor 6, resonance reactor 4 and primary winding 5a of transformer 5.

Next, when first main MOS-FET 2 is kept off and second main MOS-FET 3 is turned off, voltage resonance occurs due to resonance reactor 4, primary winding 5a of transformer 5 and voltage-resonant capacitor 7, and voltages between drain and source terminals of main MOS-FETs 2, 3 rise and fall with the slope determined by resonance frequency. At this time, voltage $V_{DS2}$ between drain and source terminals of second rectification MOS-FET 16 rises or jumps as shown in FIG. 14(E), while voltage $V_{DS1}$ between drain and source terminal of first rectification MOS-FET 15 falls or nose-dives to approximately zero volt shown in FIG. 14(F).

Moreover, when second main MOS-FET 3 is kept off, and first main MOS-FET 2 is turned on, resonance current $I_{Lr}$ shown in FIG. 14(C) is reduced due to resonance reactor 4, primary winding 5a of transformer 5 and current-resonant capacitor 6 while discharging energy stored in current-resonant capacitor 6, resonance reactor 4 and primary winding 5a of transformer 5, and then, resonance current $I_{Lr}$ flows in the adverse direction. When voltage on primary winding 5a of transformer 5 becomes an opposite polarity, and voltage induced on first secondary winding 5b reaches DC output voltage $V_O$, output smoothing capacitor 10 is charged by electric current flowing through first rectification MOS-FET 15 and DC power is supplied to load 11. When voltage applied on primary winding 5a of transformer 5 begins decreasing and voltage on first secondary winding 5b falls to or below DC output voltage, power transmission is terminated, and resonance current $I_{Lr}$ flows in primary side of transformer 5 due to resonance reactor 4, primary winding 5a of transformer 5 and current-resonant capacitor 6. Continuous repetition of the foregoing operations, main MOS-FETs 2, 3 are alternately turned on and off with the 50% duty ratio. Output voltage detector 12 detects DC output voltage $V_O$ supplied to load 11 to produce detection signals which are transmitted to control circuit 14 through photo-coupler 13. Control circuit 14 modulates pulse frequency of drive signals $V_{G1}$, $V_{G2}$ to gate terminals of main MOS-FET 2, 3 depending on detection signals from output voltage detector 12 to control the on-off operation of main MOS-FETs 2, 3 so as to maintain nearly constant or consistent DC output voltage $V_O$.

When electric current flows in secondary side of transformer 5 while one of rectification MOS-FETs 15, 16 is turned on, sine wave-like electric currents $I_{D1}$, $I_{D2}$ shown in FIGS. 14(H) and (G) flow through rectification MOS-FETs 15, 16 in the direction from source to drain terminal. At this time, as drain potential is lower than source potential in rectification MOS-FETs 15, 16 by forward voltage drop, voltages $V_{SAT1}$, $V_{SAT2}$ shown in FIGS. 14(J) and (I) between source and drain terminals in saturation region of rectification MOS-FETs 15, 16 are negative. Accordingly, conduction detecting signals $V_{P1}$, $V_{P2}$ of high voltage level shown in FIGS. 14(L) and (K) are produced from conduction detectors 17, 18 connected in parallel to rectification MOS-FETs 15, 16.

When second rectification MOS-FET 16 is in the on condition, and first rectification MOS-FET 15 is in the off condition, sine wave-like electric current $I_{D2}$ shown in FIG. 14(G) flows through second rectification MOS-FET 16 so that second conduction detector 18 produces conduction detecting signal $V_{P2}$ of high voltage level shown in FIG. 14(K), and first conduction detector 17 produces conduction detecting signal $V_{P1}$ of low voltage level shown in FIG. 14(L). Conduction detecting signal $V_{P2}$ of high voltage level from second conduction detector 18 is transmitted to second AND gate 74 in second drive signal generator 24, first charge circuit 63 in first timer circuit 23 and second discharge circuit 66 in second timer circuit 24 all together. Conduction detecting signal $V_{P1}$ of low voltage level from first conduction detector 17 is transmitted to first AND gate 73 in first drive signal generator 23, first discharge circuit 65 in first timer circuit 23 and second charge circuit 64 in second timer circuit 24. In this arrangement, a constant amount of electric current flows from first secondary winding 5b of transformer 5 through first timer capacitor 67 in first timer circuit 23 and charge circuit 63 to charge first timer capacitor 67 while increasing voltage $V_{C1}$ on first timer capacitor 67 with the certain upward slope shown in FIG. 14(M). To the contrary, second timer capacitor 68 in second timer circuit 24 is discharged by a constant amount of electric current flowing from second timer capacitor 68 through second discharge circuit 66 with the certain downward slope shown in FIG. 14(N).

When charged voltage $V_{C1}$ in first timer capacitor 67 of first timer circuit 19 reaches reference voltage $V_{R1}$ of first normal power supply 69, first comparator 71 produces output signal $V_{CP1}$ of high voltage level shown in FIG. 14(P) which is supplied to first AND gate 73 in first drive signal generator 23 while first conduction detector 17 produces conduction detecting signal $V_{P1}$ of low voltage level. Accordingly, first AND gate 73 in first drive signal generator 23 produces synchronous drive signal $V_{SC1}$ of low voltage level to gate terminal of first rectification MOS-FET 15 through first drive circuit 25. At this time, as voltage $V_{C2}$ on second timer capacitor 68 in second timer circuit 20 is higher than reference voltage $V_{R2}$ of second normal power supply 70 as shown in FIG. 14(N), second comparator 72 retains output signal $V_{CP2}$ of high voltage level shown in FIG. 14(O). Output signal $V_{CP2}$ of high voltage level from second comparator 72 and conduction detecting signal $V_{P2}$ of high voltage level from second conduction detector 18 are applied to second AND gate 74 in second drive signal generator 24 which provides synchronous drive signal $V_{SC2}$ of high voltage level shown in FIG. 14(R) for second rectification MOS-FET 16 through second drive circuit 26.

Thereafter, when voltage $V_{C2}$ of FIG. 14(N) on second timer capacitor 68 in second timer circuit 20 decreases to reference voltage $V_{R2}$ of second normal power supply 70, second comparator 72 switches output signal $V_{CP2}$ from high to low voltage level as shown in FIG. 14(O). Therefore, second AND gate 74 produces synchronous drive signal $V_{SC2}$ of low voltage level shown in FIG. 14(R) to gate terminal of second rectification MOS-FET 16 through second drive circuit 26 to turn second MOS-FET 16 off. When electric current $I_{D2}$ flowing through second MOS-FET 16 comes to nearly zero as shown in FIG. 14(G), second conduction detector 18 produces conduction detecting signal $V_{P2}$ of low voltage level shown in FIG. 14(K) to cease operations of first charge circuit 63 in first timer circuit 19 and second discharge circuit 66 in second timer circuit 20. Consequently, first timer capacitor 67 in first timer circuit 19 maintains nearly constant voltage $V_{C1}$ as shown in FIG. 14(M).

When primary main MOS-FETs 2, 3 are turned on and off to invert polarity of voltages induced on first and second secondary windings 2b, 2c of transformer 2, sine wave-like electric current $I_{D1}$ shown in FIG. 14(H) begins flowing through a parasitic diode 15a of first rectification MOS-FET 15, and first conduction detector 17 produces conduction detecting signal $V_{P1}$ of high voltage level shown in FIG. 14(L) to turn first rectification MOS-FET 15 on. Conduction detecting signal $V_{P1}$ of high voltage level from first conduction detector 17 is transmitted to first AND gate 73 in first drive signal generator 23, first discharge circuit 65 in first timer circuit 23 and second charge circuit 64 in second timer circuit 24 all together. This causes first timer capacitor 67 in first timer circuit 23 to discharge with a constant electric current flowing through first discharge circuit 65 to lower voltage $V_{C1}$ on first timer capacitor 67 with the certain slope shown in FIG. 14(M). On the other hand, a constant electric current flows from second secondary winding 5c of transformer 5 through second charge circuit 64 and second timer capacitor 68 in second timer circuit 24 to charge second timer capacitor 68 while raising voltage $V_{C2}$ on second timer capacitor 68 with the certain slope shown in FIG. 14(N).

When voltage $V_{C2}$ shown in FIG. 14(N) on second timer capacitor 68 in second timer circuit 20 reaches reference voltage $V_{R2}$ of second normal power supply 62, second comparator 72 produces output signal $V_{CP2}$ of high voltage level shown in FIG. 14(O). Output signal $V_{CP2}$ of high voltage level from second comparator 72 and conduction detecting signal $V_{P2}$ of low voltage level from second conduction detector 18 are forwarded to AND gate 74 which therefore produces synchronous drive signal $V_{SC2}$ of low voltage level shown in FIG. 14(R) to gate terminal of second rectification MOS-FET 16 through second drive circuit 26. Meanwhile, as voltage $V_{C1}$ shown in FIG. 14(M) on first timer capacitor 67 in first timer circuit 19 is higher than reference voltage $V_{R1}$ of first normal power supply 70, first comparator 71 maintains output signal $V_{CP1}$ of high voltage level shown in FIG. 14(P). Output signal $V_{CP1}$ of high voltage level from first comparator 71 and conduction detecting signal $V_{P1}$ of high voltage level from first conduction detector 17 are concurrently applied to first AND gate 73 in first drive signal generator 23 which therefore produces synchronous drive signal $V_{SC1}$ of high voltage level shown in FIG. 14(Q) to gate terminal of first rectification MOS-FET 15 through first drive circuit 25.

After that, when voltage $V_{C1}$ of FIG. 14(M) on first timer capacitor 67 in first timer circuit 19 is lowered to reference voltage $V_{R1}$ of first normal power supply 69, first comparator 71 switches output signal $V_{CP1}$ from high to low voltage level as shown in FIG. 14(P) to turn first rectification MOS-FET 15 off because first AND gate 73 in first drive signal generator 23 produces synchronous drive signal $V_{SC1}$ of low voltage level to gate terminal of first rectification MOS-FET 15 through first drive circuit 25. When electric current $I_{D1}$ of FIG. 14(H) flowing through first rectification MOS-FET 15 reduces to approximately zero and at the same time, voltage $V_{C1}$ of FIG. 14(M) on first timer capacitor 67 in first timer circuit 19 also decreases to nearly zero, first conduction detector 17 produces conduction detecting signal $V_{P1}$ of low voltage level shown in FIG. 14(L) to cease operations of first discharge circuit 65 in first timer circuit 19 and second charge circuit 64 in second timer circuit 20 while second timer capacitor 68 in second timer circuit 20 is charged to a substantially constant voltage $V_{C2}$ as shown in FIG. 14(N).

In the fifth embodiment, charging time of second and first timer capacitors 68, 67 is used to measure the conductive period of one of rectification MOS-FETs 15, 16, in other words, output period during which one of conduction detectors 17, 18 produces detection signals $V_{P1}$, $V_{P2}$ of high voltage level until electric currents $I_{D1}$, $I_{D2}$ flowing through rectification MOS-FETs 15, 16 come to zero; second and first timer capacitors 68, 67 charged after the other of rectification MOS-FETs 16, 15 is turned on are discharged; and the other of rectification MOS-FETs 16, 15 is turned off when voltages $V_{C2}$, $V_{C1}$ on second and first timer capacitor 68, 67 reduce to reference voltages $V_{R2}$, $V_{R1}$. Accordingly, the fifth embodiment is advantageous because rectification MOS-FETs 15, 16 can reliably be turned off during the period of forward electric current flow therethrough for efficient synchronous rectification. Also, the fifty embodiment is beneficial since it utilizes more simplified circuit configurations compared to first to fourth embodiments utilizing counters.

The DC power source device of the fifth embodiment has a shorter conductive period of secondary rectification MOS-FETs 15, 16 because primary main MOS-FETs 2, 3 have higher switching frequency during the light load. If rectification MOS-FETs 15, 16 operates with the shorter conductive period during the light load, and electric currents $I_{D1}$, $I_{D2}$ flowing through rectification MOS-FETs 15, 16 are of lower peak values, rectification MOS-FETs 15, 16 incur considerable drive loss or higher drive loss than reduced loss by rectification MOS-FETs 15, 16 in the secondary circuit of synchronous rectification type. Accordingly, in addition to the circuit shown in FIG. 12, DC power source device according to a sixth embodiment shown in FIG. 15, comprises a third normal power supply 83 and a third comparator 85 connected in parallel to first normal power supply 69 and first comparator 71 in first drive signal generator 23; a fourth normal power supply 84 and a fourth comparator 86 connected in parallel to second normal power supply 70 and second comparator 72 in second drive signal generator 24; a first RS flip flop (RSF/F) 87 which has a reset terminal R connected to output terminal of first comparator 71, a set terminal S connected to output terminal of third comparator 85, and an output terminal Q connected to one input terminal of first AND gate 73; a second RSF/F 88 which has a reset terminal R connected to output terminal of second comparator 72, a set terminal S connected to output terminal of fourth comparator 86 and an output terminal Q connected to one input terminal of second AND gate 74; and first and second reset circuits 89, 90 for turning one of rectification MOS-FETs 15, 16 off when voltages $V_{C1}$, $V_{C2}$ of discharging first and second timer capacitors 67, 68 are lowered to reference voltages $V_{R1}$, $V_{R2}$ of first and second normal power supplies 69, 70, and forcibly making voltages $V_{C1}$, $V_{C2}$ on first and second timer capacitors 67, 68 zero volt. As shown in FIG. 16, first and second reset circuits 89, 90 comprises discharge MOS-FET 91 connected in parallel to first timer capacitor 67; and an AND gate 92 for receiving output signal from first AND gate 73 in first drive signal generator 23 through an inverter 93 and conduction detecting signal $V_{P1}$ from first conduction detector 17 to produce a conjunctive signal of output signal from first AND gate 73 and conduction detecting signal $V_{P1}$ from first conduction detector 17 as a reset signal to a gate terminal of discharge MOS-FET 91. In first and second reset circuits 89, 90 shown in FIG. 17, output terminal of first comparator 71 may be directly connected to AND gate 92. It should be noted that first and second comparators 71, 72 shown in FIG. 15 have non-inverted and inverted input terminals opposite to those in FIG. 12. Reference voltages $V_{R3}$, $V_{R4}$ of third and fourth normal power supplies 83, 84 are set at higher levels than those of reference voltages $V_{R1}$, $V_{R2}$ of first and second normal power supplies 69, 70. Other configurations are substantially similar to those in the fifth embodiment shown in FIG. 12.

Figure 15:
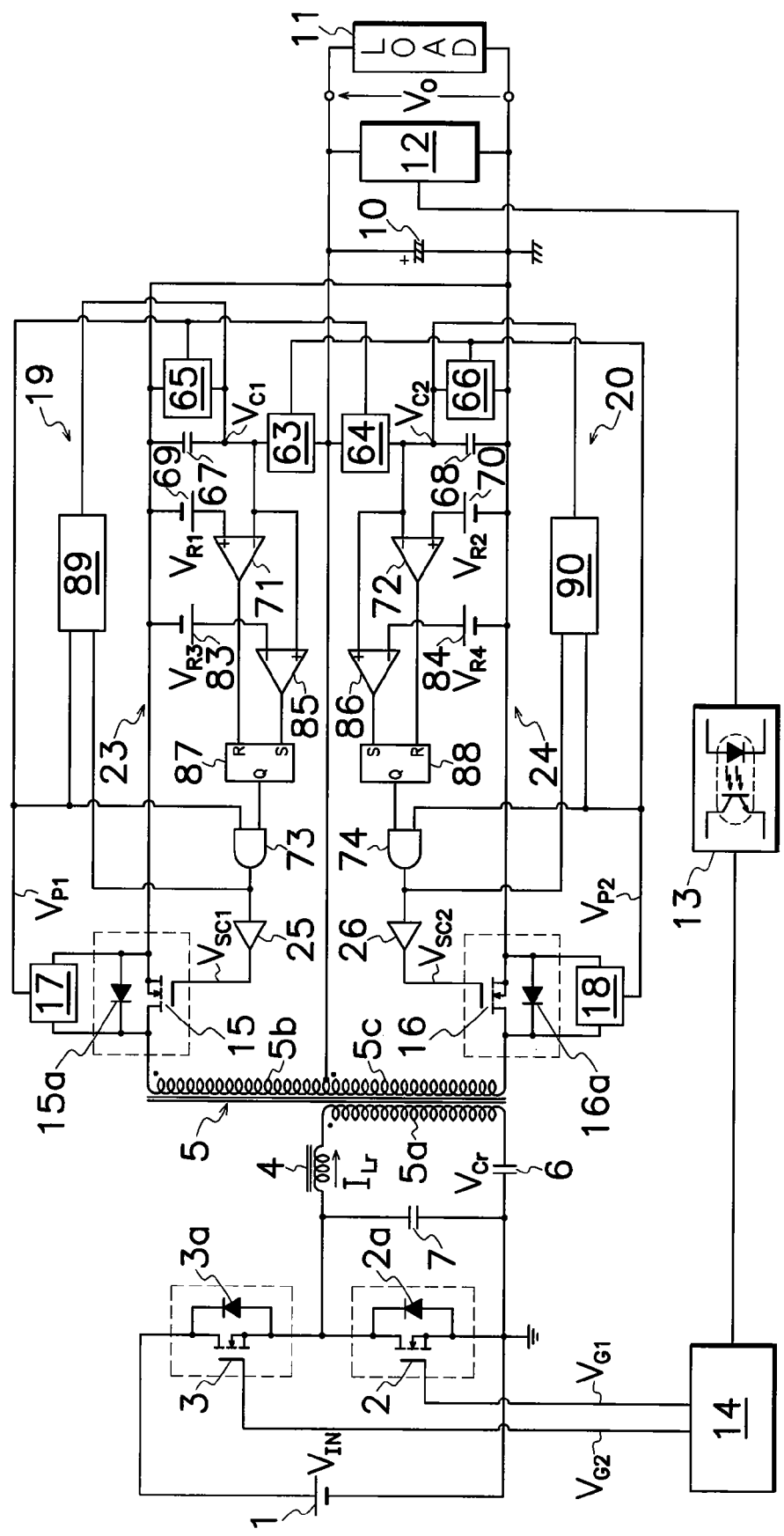
[FIG. 15] An electric circuit diagram showing a sixth embodiment of the present invention.
Figure 16:
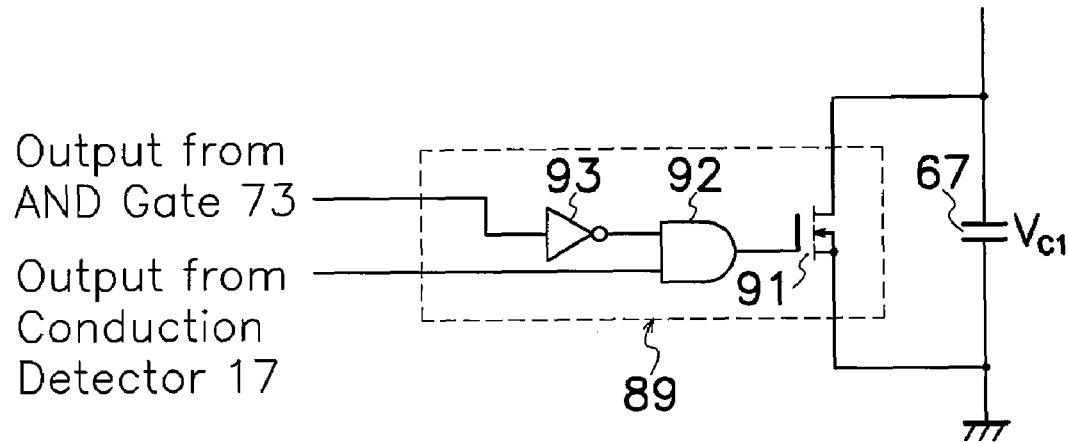
[FIG. 16] A detailed electric circuit diagram of a reset circuit shown in FIG. 15.
Figure 17:
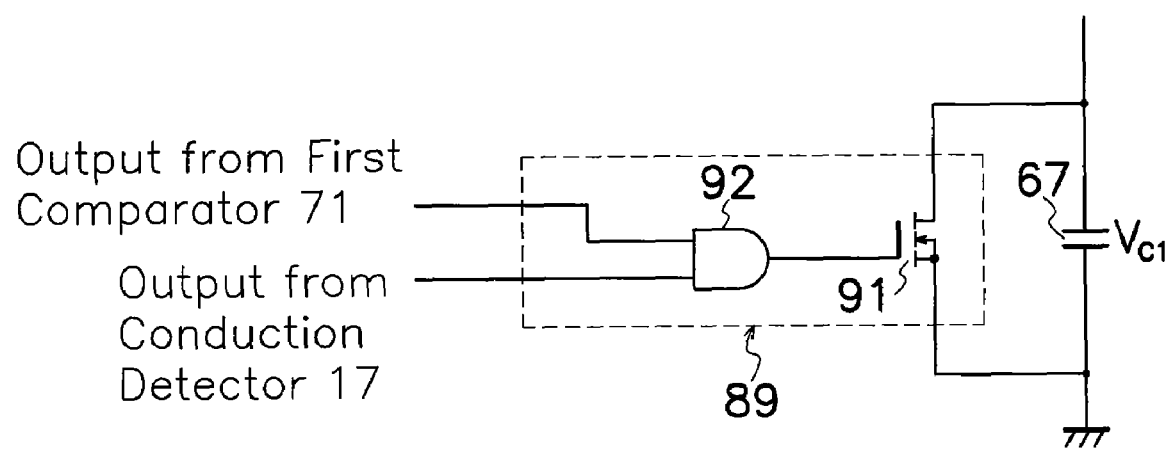
[FIG. 17] An electric circuit diagram showing another embodiment of the reset circuit shown in FIG. 15.

In FIG. 15, when second rectification MOS-FET 16 is in the on condition and first rectification MOS-FET 15 is in the off condition, second conduction detector 18 produces conduction detecting signal $V_{P2}$ of high voltage level to electrically charge first timer capacitor 67 by a constant current flowing from output smoothing capacitor 10 through first charge circuit 63 in first timer circuit 19 to first timer capacitor 67, while second timer capacitor 68 in second timer circuit 20 is discharged with a constant electric current through second discharge circuit 66. When voltage $V_{C1}$ on first timer capacitor 67 in first timer circuit 19 rises to reference voltage $V_{R3}$ of third normal power supply 83, third comparator 85 produces output signal of high voltage level to set terminal S of first RSF/F 87 which develops output of high voltage level from output terminal Q to one input terminal of first AND gate 73 in first drive signal generator 23. Then, when voltage $V_{C2}$ on second timer capacitor 68 in second timer circuit 20 falls to reference voltage $V_{R2}$ of second normal power supply 70, second comparator 72 forwards output signal of high voltage level to reset terminal R of second RSF/F 88 which therefore produces output signal of low voltage level at output terminal Q. Therefore, second AND gate 74 forwards synchronous drive signal $V_{SC2}$ of low voltage level to gate terminal of second rectification MOS-FET 16 through second drive circuit 26 to turn second rectification MOS-FET 16 off. At the same time, second AND gate 74 in second drive signal generator 24 forwards output signal to one input terminal of AND gate 92 through inverter 93 in second reset circuit 90, and second conduction detector 18 forwards conduction detecting signal $V_{P2}$ of high voltage level to the other input terminal of AND gate 92 which therefore produces a conjunctive signal of output signal from second AND gate 74 and conduction detecting signal $V_{P2}$ to turn discharge MOS-FET 91 on to cause voltage $V_{C2}$ on second timer capacitor 68 in second timer circuit 20 to drop to zero volt. Then, sine wave-like electric current $I_{D1}$ flows through first rectification MOS-FET 15; first conduction detector 17 produces conduction detecting signal $V_{P1}$ of high voltage level which is given to the other input terminal of first AND gate 73 in first drive signal generator 23; and first AND gate 73 produces synchronous drive signal $V_{SC1}$ of high voltage level to gate terminal of first rectification MOS-FET 15 through first drive circuit 25 to turn first rectification MOS-FET 15 on.

When first rectification MOS-FET 15 is in the on condition and second rectification MOS-FET 16 is in the off condition, first conduction detector 17 produces conduction detecting signal $V_{P1}$ of high voltage level, and second timer capacitor 68 is charged with a constant electric current flowing from output smoothing capacitor 10 through second charge circuit 64 in second timer circuit 20 to second timer capacitor 68 while first timer capacitor 67 in first timer circuit 19 is discharged with a constant electric current flowing through first discharge current 65. When voltage $V_{C2}$ on second timer capacitor 68 in second timer circuit 20 rises to reference voltage $V_{R4}$ of fourth normal power supply 84, fourth comparator 86 produces output signal of high voltage level to set terminal S of second RSF/F 88 which therefore generates output signal of high voltage level at output terminal Q to one input terminal of second AND gate 74 in second drive signal generator 24. Then, when voltage $V_{C1}$ on first timer capacitor 67 in first timer circuit 19 falls to reference voltage $V_{R1}$ of first normal power supply 69, first comparator 71 produces output signal of high voltage level to reset terminal R of first RSF/F 87 which develops output signal of low voltage level at output terminal Q. Thus, first AND gate 73 in first drive signal generator 23 produces synchronous drive signal $V_{SC1}$ of low voltage level to gate terminal of first rectification MOS-FET 15 through first drive circuit 25 to turn first rectification MOS-FET 15 off. Simultaneously, first AND gate 73 in first drive signal generator 23 forwards output signal to one input terminal of AND gate 92 through inverter 93 in first reset circuit 89, and first conduction detector 17 produces conduction detecting signal $V_{P1}$ of high voltage level to the other input terminal of AND gate 92 which therefore generates a conjunctive signal of these input signals to turn discharge MOS-FET 91 on while making voltage $V_{C1}$ on first timer capacitor 67 in first timer circuit 19 zero volt. Thereafter, sine wave-like electric current $I_{D2}$ flows through second rectification MOS-FET 16 and second conduction detector 18 produces conduction detecting signal $V_{P2}$ of high voltage level to the other input terminal of second AND gate 74 in second drive signal generator 24. Therefore, second AND gate 74 supplies synchronous drive signal $V_{SC2}$ of high voltage level to gate terminal of second rectification MOS-FET 16 through second drive circuit 26 to turn second rectification MOS-FET 16 on. In case that each rectification MOS-FET 15, 16 drives with the shorter conductive period under the light load, and voltages $V_{C1}$, $V_{C2}$ on first and second timer capacitors 67, 68 do not reach reference voltages $V_{R3}$, $V_{R4}$ of third and fourth normal power supplies 83, 84, third and fourth comparators 85, 86 produce output signals of low voltage level to set terminals S of first and second RSF/F 87, 88 to prevent setting of first and second RSF/F 87, 88, thereby inhibiting operation of each rectification MOS-FET 15, 16. This can control and reduce power consumption and drive loss by rectification MOS-FETs 15, 16 during the light load By the way, in the DC power source device of the fifth embodiment, secondary rectification MOS-FET 15, 16 are ordinarily driven with the same conductive periods to each other, however, in some cases, second rectification MOS-FET 16 may operate with the shorter conductive period than that of first rectification MOS-FET 15 due to fluctuation or the like in load 11. To overcome such a malfunction, the fifth embodiment contemplates provision of dead time $t_D$ during which rectification both MOS-FETs 15, 16 are simultaneously in the off condition. However, if second rectification MOS-FET 16 continuously operates with the shorter conductive period than that of first rectification MOS-FET 15 for long time, voltages $V_{C1}$, $V_{C2}$ on first and second timer capacitors 67, 68 cannot be fully discharged to zero volt to cause overlapped voltages $V_{C1}$, $V_{C2}$, and therefore, in some cases, the arrangement does not have dead times $t_D$ of sufficient length while recovering electric current flowing in secondary side to primary side. Therefore, in the sixth embodiment, first and second reset circuits 89, 90 detect trailing edge in output signals from first and second AND gates 73, 74 to reset first and second timer capacitors 67, 68 in timer circuits 19, 20 each cycle so that voltages $V_{C1}$, $V_{C2}$ on timer capacitors 67, 68 are reset to zero volt each cycle to prevent overlapping of voltages $V_{C1}$, $V_{C2}$ in first and second timer capacitors 67, 68.

Figure 18:
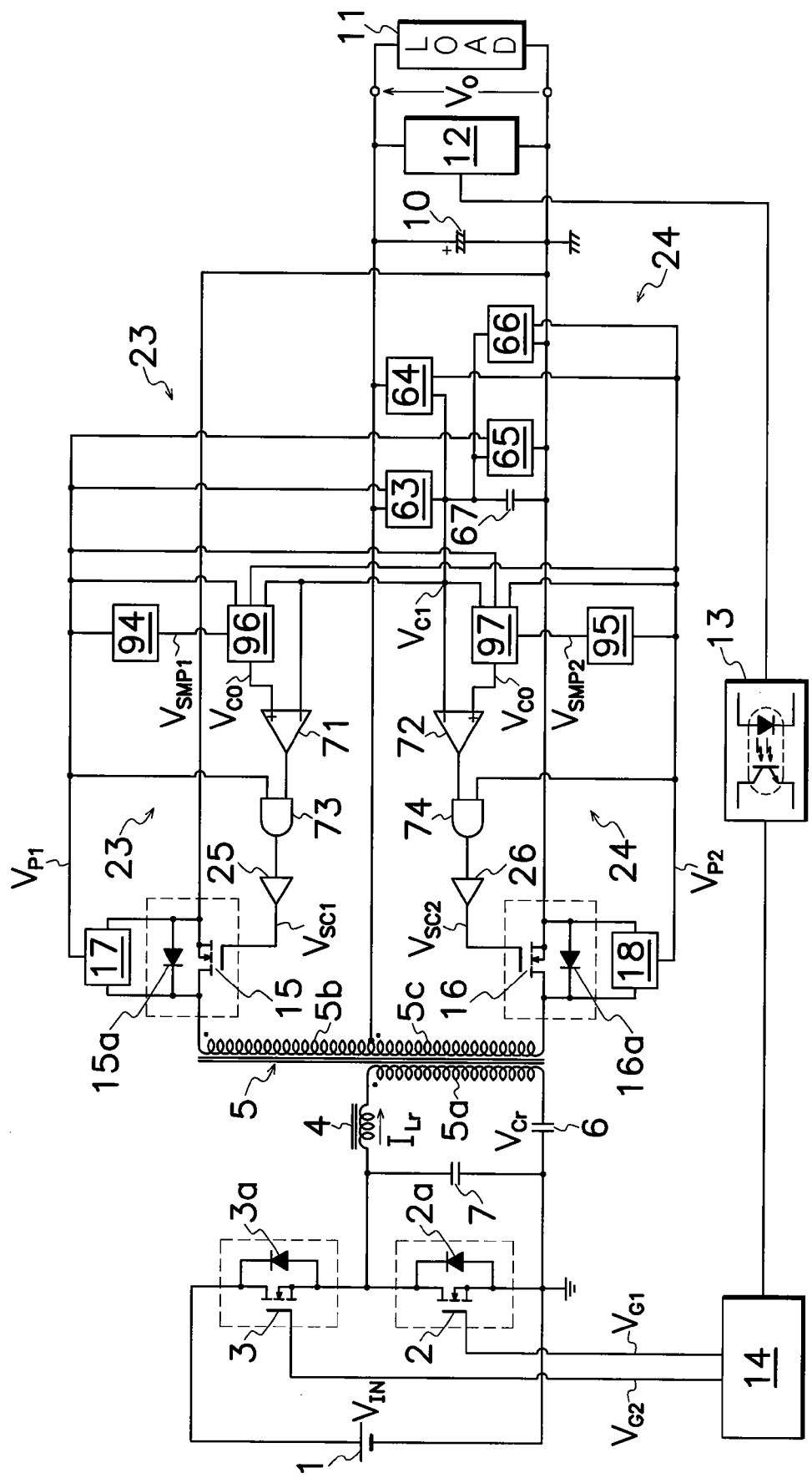
[FIG. 18] An electric circuit diagram showing a seventh embodiment of the present invention.
Figure 19:
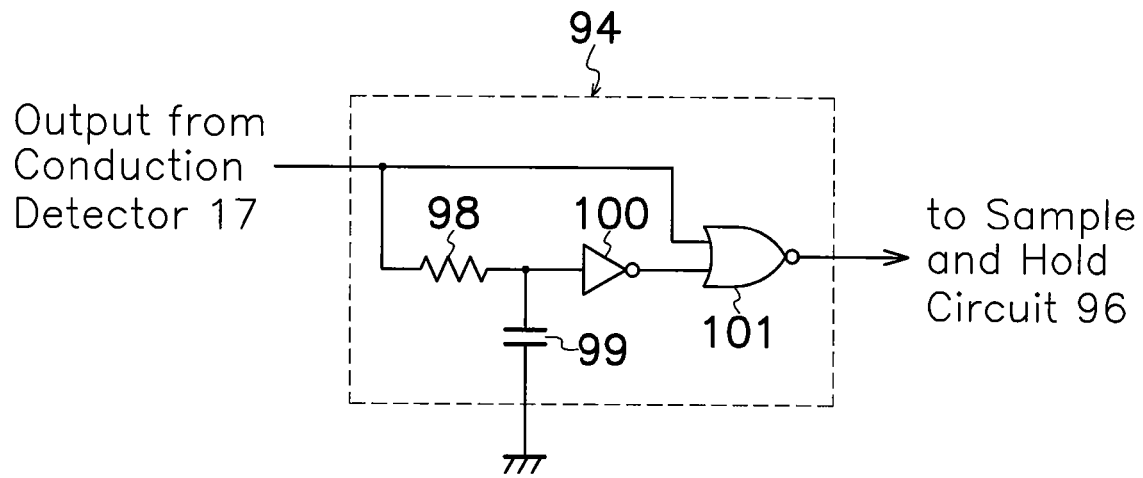
[FIG. 19] A detailed electric circuit diagram of a pulse generator shown in FIG. 18.

DC power source device of the fifth embodiment shown in FIG. 12 may be modified as shown in FIG. 18. Specifically, a DC power source device shown in FIG. 18 of a seventh embodiment according to the present invention, comprises first and second timer circuits 19, 20 which include a timer capacitor 67, and first and second drive signal generators 23, 24. Timer capacitor 67 is electrically charged with a constant current flowing from output smoothing capacitor 10 through first and second charge circuits 63, 64 to timer capacitor 67 during the conductive period of rectification MOS-FETs 15, 16 and discharged to zero volt through first and second discharge circuits 65, 66 after termination of the conductive period of rectification MOS-FETs 15, 16. First and second drive signal generators 23, 24 utilize output signals $V_{P1}$, $V_{P2}$ from one of conduction detectors 17, 18 to turn one of rectification MOS-FETs 15, 16 on, store voltage $V_{CO}$ on timer capacitor 67 upon termination of the conductive period of the other of rectification MOS-FETs 16, 15, and turn one of rectification MOS-FETs 15, 16 off when voltage $V_{C1}$ on timer capacitor 67 charged during the conductive period of one of rectification MOS-FET 15, 16 exceeds the stored voltage $V_{CO}$. First and second drive signal generators 23, 24 comprise first and second sampling pulse generators 94, 95, first and second sample and hold circuits 96, 97, first and second comparators 71, 72 and first and second AND gates 73, 74. First and second sampling pulse generators 94, 95 are driven by output signals $V_{P1}$, $V_{P2}$ from conduction detectors 17, 18 to generate sampling pulse signals $V_{SMP1}$, $V_{SMP2}$. First and second sample and hold circuits 96, 97 sample and hold voltage $V_{C1}$ on timer capacitor 67 in response to sampling pulse signals $V_{SMP1}$, $V_{SMP2}$ from first and second sampling pulse generators 94, 95 upon termination of the conductive period of the other of rectification MOS-FETs 16, 15, produce sampled voltage $V_{CO}$ during the conductive period of one of rectification MOS-FETs 15, 16, and reset the sampled voltage $V_{CO}$ to zero volt after termination of the conductive period of one of rectification MOS-FET 15, 16. First and second comparators 71, 72 compare voltage $V_{C1}$ on timer capacitor 67 charged during the conductive period of one of rectification MOS-FETs 15, 16 with sampled voltage $V_{CO}$ in first and second sample and hold circuits 96, 97, and produce output signals $V_{CP1}$, $V_{CP2}$ of low voltage level when charged voltage $V_{C1}$ on timer capacitor 67 exceeds sampled voltage $V_{CO}$. First and second AND gates 73, 74 produce a conjunctive signal of output signals $V_{P1}$, $V_{P2}$ from conduction detectors 17, 18 and output signals $V_{CP1}$, $V_{CP2}$ from first and second comparators 71, 72. As shown in FIG. 19, first and second sampling pulse generators 94, 95 comprise a resistor 98 and a capacitor 99 connected in series between output terminal of conduction detectors 17, 18 and secondary ground, an inverting amplifier 100 having an input terminal connected to a junction of resistor 98 and capacitor 99, and a NOR gate 101 which has one input terminal directly connected to output terminal of conduction detector 17, 18, the other input terminal connected to output terminal of inverting amplifier 100, and an output terminal connected to first and second sample and hold circuits 96, 97. Other configurations are substantially similar to those in the fifth embodiment shown in FIG. 12.

In the seventh embodiment, when the other of rectification MOS-FETs 15, 16 is in the conductive condition, in other words, when the other of conduction detectors 18, 17 produces output signal $V_{P2}$, $V_{P1}$ of high voltage level, timer capacitor 67 is charged with a constant current flowing from second or first secondary winding 5c, 5b of transformer 5 through second or first charge circuit 64, 63 to timer capacitor 67. Upon termination of the conductive period of the other of rectification MOS-FET 16, 15, in other words, when the other of conduction detectors 18, 17 switches output signals $V_{P2}$, $V_{P1}$ from high to low voltage level, first or second sample and hold circuit 96, 97 samples voltage $V_{C1}$ on timer capacitor 67 in synchronization with sampling pulse signals $V_{SMP1}$, $V_{SMP2}$ from first or second sampling pulse generators 94, 95 and retains sampled voltage $V_{C1}$ as voltage $V_{CO}$. Then, timer capacitor 67 is discharged from voltage $V_{C1}$ to zero volt through second or first discharge circuit 66, 65. Subsequently, when one of rectification MOS-FETs 15, 16 is turned on by means of output signal $V_{P1}$, $V_{P2}$ from one of conduction detector 17, 18, timer capacitor 67 is charged with a constant current flowing from first or second secondary winding 5b, 5c of transformer 5 so that voltage $V_{C1}$ on timer capacitor 67 increases with the certain slope. When charged voltage $V_{C1}$ on timer capacitor 67 exceeds sampled voltage $V_{CO}$ generated from first or second sample and hold circuit 96, 97, first or second comparator 71, 72 produces output signal $V_{CP1}$, $V_{CP2}$ of low voltage level to first and second AND gate 73, 74 to turn one of rectification MOS-FET 15, 16 off through first or second drive circuit 25, 26. Thereafter, sampled voltage $V_{CO}$ on first or second sample and hold circuit 96, 97 is reset to zero volt, and timer capacitor 67 is discharged from voltage $V_{C1}$ to zero volt through first or second discharge circuit 65, 66. Accordingly, even in the seventh embodiment, rectification MOS-FETs 15, 16 can be turned off during the conductive period of forward current flow for efficient synchronous rectification similarly to the fifth embodiment. Also, the seventh embodiment is of advantage over the fifth embodiment because the seventh embodiment requires a single timer capacitor for simplified circuit configurations of timer circuits 19, 20 compared to the fifth embodiment.

The foregoing embodiments of the present invention may be varied in further various ways without limitation to the foregoing first to seventh embodiments. By way of example, first and fourth embodiments time the conductive period of one of rectification MOS-FETs 15, 16 by the counting up operation of second and first counters 22, 21 in the other timer circuit 24, 23; and after turning the other of rectification MOS-FETs 15, 16 on, the period is timed by the counting down operation of second and first counters 22, 21 to turn the other of rectification MOS-FETs 16, 15 off when the counted number is 1 in binary digit. However, the counting up and down operations can be exchanged between first and second counters 21, 22. In lieu of first and second counters 21, 22 or up-counter circuit 49, the second and third embodiments may utilize one or two down-counter circuits, and in lieu of subtracting circuits 52, 53, an adding circuit or circuits may be used to output the counted number resulted by adding a predetermined numeral value to the counted number retained in latch circuits 18, 19. Also, to obtain similar functions and effects to those in the sixth embodiment, comparators of the hysteretic characteristics can be substituted for first and second comparators 71, 72 in the fifth embodiment. In the first and seventh embodiments, each rectification MOS-FETs 15, 16 are connected to ground terminal side, but instead, they may be connected to positive output terminal like that shown in FIG. 20. The first to seventh embodiments utilize a circuit configuration of the half bridge type in primary side, but instead, utilize a circuit construction of the push-pull type. Without limitation of application to current-resonant DC power source device in the first to seventh embodiments, the present invention is also applicable to DC power source device of half-bridge, full-bridge, push-pull type or the like. The instant invention is also applicable to DC power source device which has two synchronous switching elements through which electric current alternately flows with the same duty ratio in secondary side.

INDUSTRIAL APPLICABILITY

The present invention can preferably be applied to DC power source device which has a synchronous rectification circuit of center tap type.

What is claimed are:

1. A DC power source device comprising:
   a pair of main switching elements connected in series to a DC power supply;
   a transformer which comprises a primary winding connected in parallel to at least one of the main switching elements, a first secondary winding and a second secondary winding connected in series to the first secondary winding;
   a pair of rectification switching elements connected in series to opposite ends of the first and second secondary windings with the adverse polarity;
   a polarity detecting means for detecting each polarity of the rectification switching elements; and
   a timer means connected to the polarity detecting means for synchronously driving the rectification switching elements with the switching operation of the main switching elements to produce the DC output between a junction of the first and second secondary windings of the transformer and a junction of the rectification switching elements;
   wherein the polarity detecting means comprises conduction detectors for producing a conduction detecting signal when electric current flows through the rectification switching element;
   the timer means comprises:
      counters for counting up or down during the conductive period of one of the rectification switching elements and counting down or up during the conductive period of the other of the rectification switching elements, and
      a drive signal generator for turning the one of the rectification switching elements on by making use of the conduction detecting signal from one of the conduction detectors, and turning the one of the rectification switching elements off upon counting up or down to a predetermined counted number by one of the counters and at the same time resetting the one of the counters; and
   the timer means counts output time of the conduction detecting signal from the polarity detecting means until electric current through the one of the rectification switching elements comes to zero, and turns the other of the rectification switching elements off at the time of, around or immediately before termination of the counted time.

2. The DC power source device of claim 1, wherein said timer means comprises an oscillation circuit for supplying to the counter clock signals of frequency sufficiently higher than the switching frequency of the main switching elements; and
   said oscillation circuit is driven in synchronization with the conduction detecting signals from said polarity detecting means.

3. The DC power source device of claim 1, wherein said timer means comprises a light load detector for refraining from providing operation signals for said drive signal generator until said counter counts a predetermined counted number; and
   said drive signal generator refrains from driving the rectification switching elements until said light load detector produces the operation signal.

4. A DC power source device comprising:
   a pair of main switching elements connected in series to a DC power supply;
   a transformer which comprises a primary winding connected in parallel to at least one of the main switching elements, a first secondary winding and a second secondary winding connected in series to the first secondary winding;

a pair of rectification switching elements connected in series to opposite ends of the first and second secondary windings with the adverse polarity;

a polarity detecting means for detecting each polarity of the rectification switching elements; and a timer means connected to the polarity detecting means for synchronously driving the rectification switching elements with the switching operation of the main switching elements to produce the DC output between a junction of the first and second secondary windings of the transformer and a junction of the rectification switching elements;

wherein the polarity detecting means comprises conduction detectors for producing a conduction detecting signal when electric current flows through the rectification switching element;

the timer means comprises:

a first counter for counting up or down during the conductive period of one of the rectification switching elements, a second counter for counting down or up during the conductive period of the other of the rectification switching elements, a first drive signal generator for storing a counted number of the second counter and resetting the second counter when the other of the conduction detectors ceases production of the conduction detecting signal, turning the one of the rectification switching elements on and causing the first counter to count up or down when one of the conduction detectors produces the conduction detecting signal, and turning the one of the rectification switching elements off when the first counter counts the counted number smaller than the stored counted number of the second counter by a predetermined numerical value, and a second drive signal generator for storing a counted number of the first counter and resetting the first counter when the one of the conduction detectors ceases production of the conduction detecting signal, turning the other of the rectification switching elements on and causing the second counter to count up or down when the other of the conduction detectors produces the conduction detecting signal, and turning the other of the rectification switching elements off when the second counter counts the counted number smaller than the stored counted number of the first counter by a predetermined numerical value; and the timer means counts output time of the conduction detecting signal from the polarity detecting means until electric current through the one of the rectification switching elements comes to zero, and turns the other of the rectification switching elements off at the time of, around or immediately before termination of the counted time.

5. A DC power source device comprising:

a pair of main switching elements connected in series to a DC power supply;

a transformer which comprises a primary winding connected in parallel to at least one of the main switching elements, a first secondary winding and a second secondary winding connected in series to the first secondary winding;

a pair of rectification switching elements connected in series to opposite ends of the first and second secondary windings with the adverse polarity;

a polarity detecting means for detecting each polarity of the rectification switching elements; and a timer means connected to the polarity detecting means for synchronously driving the rectification switching elements with the switching operation of the main switching elements to produce the DC output between a junction of the first and second secondary windings of the transformer and a junction of the rectification switching elements;

wherein the polarity detecting means comprises conduction detectors for producing a conduction detecting signal when electric current flows through the rectification switching element:

the timer means comprises:

counters for counting up or down during the conductive period of the rectification switching elements, and a drive signal generator for storing a counted number of the counter and resetting the counter when the other of the conduction detectors ceases production of the conduction detecting signal, turning one of the rectification switching elements and causing the counter to count up or down when one of the conduction detectors produces the conduction detecting signal, and turning the one of the rectification switching elements off when the counter counts the counted number smaller than the stored counted number by a predetermined numerical value; and the timer means counts output time of the conduction detecting signal from the polarity detecting means until electric current through the one of the rectification switching elements comes to zero, and turns the other of the rectification switching elements off at the time of, around or immediately before termination of the counted time.

6. A DC power source device comprising:

a pair of main switching elements connected in series to a DC power supply;

a transformer which comprises a primary winding connected in parallel to at least one of the main switching elements, a first secondary winding and a second secondary winding connected in series to the first secondary winding;

a pair of rectification switching elements connected in series to opposite ends of the first and second secondary windings with the adverse polarity;

a polarity detecting means for detecting each polarity of the rectification switching elements; and a timer means connected to the polarity detecting means for synchronously driving the rectification switching elements with the switching operation of the main switching elements to produce the DC output between a junction of the first and second secondary windings of the transformer and a junction of the rectification switching elements;

wherein the polarity detecting means comprises conduction detectors for producing a conduction detecting signal when electric current flows through the rectification switching element;

the timer means comprises:

capacitors electrically charged by electric current flowing through a charge circuit under the DC output during the conductive period of the other of the rectification switching elements, and discharged by electric current flowing through a discharge circuit during the conductive period of one of the rectification switching elements, and a drive signal generator for turning the one of the rectification switching elements on by making use of the conduction detecting signal from one of the conduction detectors, and turning the one of the rectification switching elements off when voltage on one of the capacitors reaches reference voltage; and the timer means counts output time of the conduction detecting signal from the polarity detecting means until electric current through the one of the rectification switching elements comes to zero, and turns the other of the rectification switching elements off at the time of, around or immediately before termination of the counted time.

7. The DC power source device of claim 6, wherein said charge circuit electrically charges said capacitors with the constant charging electric current;

said discharge circuit discharges said capacitors with the constant discharging electric current;

said charging and discharging electric currents are equal in amount to each other; and said reference voltages to be compared with voltages on the capacitors are of the identical value.

8. The DC power source device of claim 6, wherein said timer means comprises a reset circuit for turning the one of said rectification switching elements and forcibly making voltage on the one of said rectification switching elements zero potential when voltage on the one of said capacitors reaches said reference voltage during the discharge period.

9. The DC power source device of claim 6, wherein said drive signal generator turns the rectification switching elements on by making use of the conduction detecting signal from the conduction detectors when said capacitor is electrically charged to or over the other reference voltage higher than said reference voltage; and said drive signal generator turns the rectification switching elements off when said capacitor is discharged to the other reference voltage.

10. A DC power source device comprising:

a pair of main switching elements connected in series to a DC power supply;

a transformer which comprises a primary winding connected in parallel to at least one of the main switching elements, a first secondary winding and a second secondary winding connected in series to the first secondary winding;

a pair of rectification switching elements connected in series to opposite ends of the first and second secondary windings with the adverse polarity;

a polarity detecting means for detecting each polarity of the rectification switching elements; and a timer means connected to the polarity detecting means for synchronously driving the rectification switching elements with the switching operation of the main switching elements to produce the DC output between a junction of the first and second secondary windings of the transformer and a junction of the rectification switching elements;

wherein the polarity detecting means comprises conduction detectors for producing a conduction detecting signal when electric current flows through the rectification switching element;

the timer means comprises:

a capacitor electrically charged by electric current flowing through a charge circuit under the DC output during the conductive period of the rectification switching elements, and discharged by electric current flowing through a discharge circuit to zero volt after termination of the conductive period of the rectification switching elements, and a drive signal generator for turning one of the rectification switching elements on by making use of the conduction detecting signal from one of the conduction detectors, storing the voltage on said capacitor when the conductive period of the other of the rectification switching elements is terminated, and turning the one of the rectification switching elements off when voltage on the capacitor, charged during the conductive period of the one of the rectification switching elements exceeds a predetermined voltage lower than the stored voltage; and the timer means counts output time of the conduction detecting signal from the polarity detecting means until electric current through the one of the rectification switching elements comes to zero, and turns the other of the rectification switching elements off at the time of, around or immediately before termination of the counted time.

* * * * *